US010788769B2

(12) United States Patent
Katagiri et al.

(10) Patent No.: US 10,788,769 B2
(45) Date of Patent: Sep. 29, 2020

(54) IMAGE FORMING APPARATUS

(71) Applicant: CANON KABUSHIKI KAISHA, Tokyo (JP)

(72) Inventors: Shinji Katagiri, Yokohama (JP); Ken Nakagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/162,054

(22) Filed: Oct. 16, 2018

(65) Prior Publication Data

US 2019/0113860 A1    Apr. 18, 2019

(30) Foreign Application Priority Data

Oct. 18, 2017  (JP) ................. 2017-202089

(51) Int. Cl.
| G03G 15/02 | (2006.01) |
| G03G 15/043 | (2006.01) |
| G02B 27/09 | (2006.01) |
| G03G 15/04 | (2006.01) |
| G03G 15/16 | (2006.01) |
| G03G 15/06 | (2006.01) |
| G03G 15/00 | (2006.01) |

(52) U.S. Cl.
CPC ..... *G03G 15/0266* (2013.01); *G02B 27/0977* (2013.01); *G03G 15/043* (2013.01); *G03G 15/04036* (2013.01); *G03G 15/065* (2013.01); *G03G 15/16* (2013.01); *G03G 15/5037* (2013.01)

(58) Field of Classification Search
CPC ... G03G 15/16; G03G 15/043; G03G 15/0266
See application file for complete search history.

(56) References Cited

U.S. PATENT DOCUMENTS

| 2001/0026694 A1 | 10/2001 | Sakaizawa |
| 2013/0235142 A1 | 9/2013 | Katagiri |
| 2013/0308969 A1 | 11/2013 | Hasegawa |
| 2014/0161471 A1* | 6/2014 | Matsuno ............ G03G 15/0812 399/27 |
| 2015/0104207 A1* | 4/2015 | Sakato ................. G03G 15/065 399/50 |

FOREIGN PATENT DOCUMENTS

| JP | H06-250501 A | 9/1994 |
| JP | H06-258923 A | 9/1994 |
| JP | 2003-312050 A | 11/2003 |
| JP | 2007-310079 A | 11/2007 |

(Continued)

*Primary Examiner* — Walter L Lindsay, Jr.
*Assistant Examiner* — Andrew V Do
(74) *Attorney, Agent, or Firm* — Canon U.S.A., INC. IP Division

(57) ABSTRACT

Let V1 be a potential difference between a photosensitive member charged by a charging member to which a second charging voltage is applied in a preparation process and a developing member to which a developing voltage is applied. Let V2 be a potential difference between the photosensitive member charged by the charging member to which a first charging voltage is applied in an image forming process and the developing member. Given this definition, a relation of |V1|<|V2| is satisfied.

10 Claims, 12 Drawing Sheets

(56) References Cited

FOREIGN PATENT DOCUMENTS

| | | |
|---|---|---|
| JP | 2013-7822 A | 1/2013 |
| JP | 2013-109322 A | 6/2013 |
| JP | 2014-077881 A | 5/2014 |
| JP | 2014-106287 A | 6/2014 |
| JP | 2014-123017 A | 7/2014 |

* cited by examiner

IMAGE FORMING APPARATUS

BACKGROUND OF THE DISCLOSURE

Field of the Disclosure

Embodiments of the disclosure relate to an image forming apparatus that forms an image on a recording medium using electrophotographic processes.

Description of the Related Art

A contact-developing image forming apparatus performs development while holding a developing member in contact with a photosensitive member. For this type of apparatus, it is necessary to reduce the deterioration of a photosensitive member and a developing member for a longer service life. Therefore, a developing member is on standby at a position for putting no toner onto a photosensitive member (separated position) when no image is formed. The developing member is moved to a position for putting a toner onto the photosensitive member (contact position) when, and only when, an image is formed.

To improve image quality, Japanese Patent Laid-Open No. 2003-312050 discloses that an exposure unit generates not only bright potential by optically exposing an image portion where a toner is to be put onto the surface of a photosensitive member but also dark potential by optically exposing a non-image portion where no toner is to be put onto the surface of the photosensitive member. When this processing is performed, dark potential for putting no toner onto it is generated by setting the amount of exposure of the non-image portion to be smaller than the amount of exposure of the image portion.

Receiving image data, an image forming apparatus that is in a standby state executes a preparation process to become ready for forming an image. After that, the image forming apparatus executes an image forming process to form an image on a recording medium. In the preparation process, control operation is performed for ensuring that a photosensitive member, etc. will rotate at a speed that is suitable for forming an image and ensuring that a rotating polygon mirror of an exposure unit will also rotate at such a speed.

On the other hand, from the viewpoint of enhancing usability, etc., it is demanded to reduce the time taken for an image forming apparatus to print out image data after data reception (FPOT: First Print Out Time).

A possible approach for reducing the FPOT is to shorten the time of the preparation process by moving the developing member from the position for putting no toner onto the photosensitive member to the position for putting a toner onto the photosensitive member during the adjustment of the rotation speed of the photosensitive member and the rotating polygon mirror. When this approach is taken, it is necessary to set the potential of the photosensitive member at dark potential for putting no toner so that wasteful toner consumption will not occur due to transfer of a toner onto the surface of the photosensitive member when the developing member is brought to the position for putting the toner onto the photosensitive member. In an image forming apparatus that generates dark potential for putting no toner by exposure of a non-image portion as described above, especially, it is necessary to perform exposure of the non-image portion after charging by a charging member.

However, during rotation speed adjustment, the rotation speed of the photosensitive member and the rotation speed of the rotating polygon mirror are not constant. For this reason, the amount of exposure per area on the surface of the photosensitive member does not become constant though exposure of the non-image portion is performed. Therefore, it is impossible to generate appropriate dark potential.

In an image forming apparatus that generates potential for putting no toner by exposure of a non-image portion when an image is formed, the present disclosure makes it possible to, for example, avoid a toner from being transferred onto the surface of a photosensitive member even though a developing member is brought to the position for putting a toner onto the photosensitive member during the adjustment of the rotation speed of the photosensitive member or a rotating polygon mirror.

SUMMARY OF THE DISCLOSURE

An image forming apparatus according to an aspect of the present disclosure includes a photosensitive member, a charging member, an exposure unit, a developing member, a charging voltage applying unit, a developing voltage applying unit, and a control unit. The charging member charges a surface of the photosensitive member. The exposure unit performs non-image portion exposure and image portion exposure on the photosensitive member charged by the charging member. The non-image portion exposure is exposure for generating surface potential not for forming a toner image. The image portion exposure is exposure for generating the surface potential for forming the toner image. An exposure amount of the image portion exposure is larger than an exposure amount of the non-image portion exposure. The developing member forms the toner image by supplying a toner onto the surface of the photosensitive member. The charging voltage applying unit applies a charging voltage to the charging member. The developing voltage applying unit applies a developing voltage to the developing member. The control unit controls the charging voltage applying unit and the developing voltage applying unit. The control unit performs control such that a first charging voltage is applied in a first process in which the image portion exposure and the non-image portion exposure are performed on the surface of the photosensitive member by the exposure unit and that a second charging voltage is applied in a second process in which the image portion exposure and the non-image portion exposure are not performed on the surface of the photosensitive member by the exposure unit. A potential difference between the photosensitive member charged by the charging member to which the second charging voltage is applied in the second process and the developing member is defined as V1. A potential difference between the photosensitive member charged by the charging member to which the first charging voltage is applied in the first process and the developing member is defined as V2. The control unit performs control such that a relation of $|V1|<|V2|$ is satisfied.

Further features, aspects and advantages of the present disclosure will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the disclosure as defined hereinabove. In particular, features from different embodiments can be combined where

DESCRIPTION OF THE EMBODIMENTS

First Embodiment

Figure 1A:
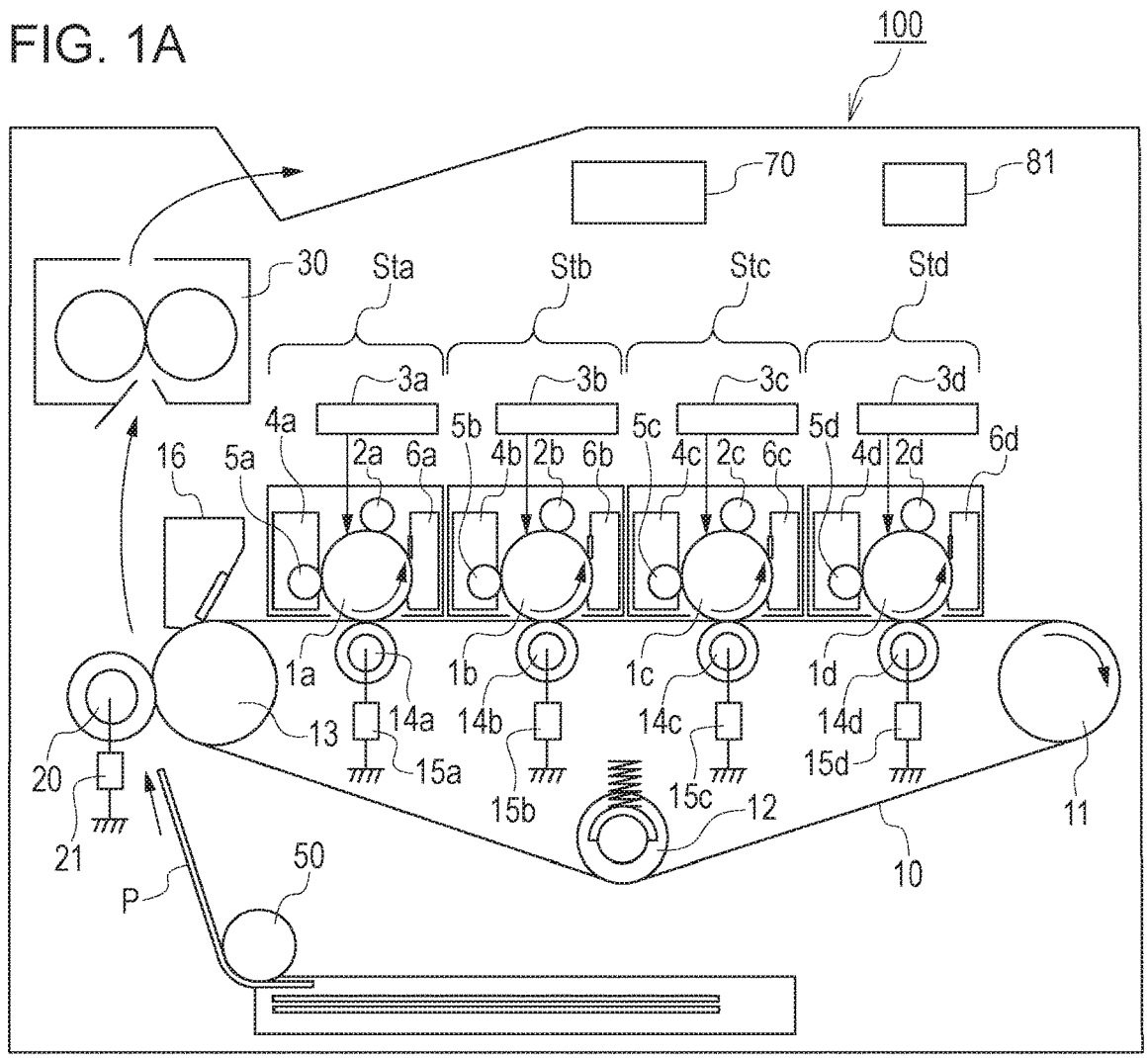
FIG. 1A is a schematic cross-sectional view of an image forming apparatus.
Figure 1B:
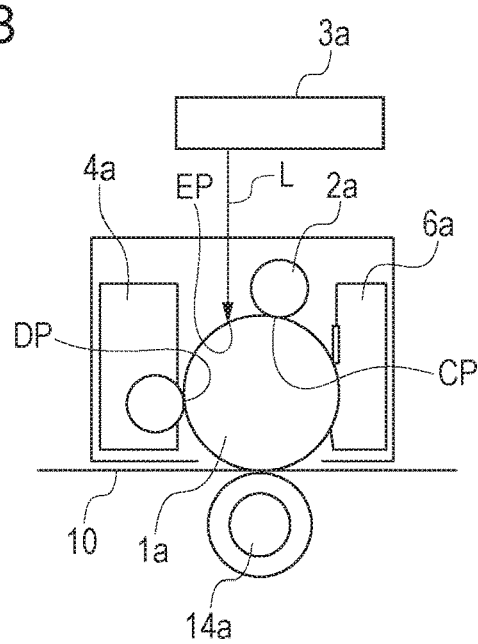
FIG. 1B is a schematic enlarged view of the neighborhood of a photosensitive drum in the cross section of the image forming apparatus.

With reference to FIGS. 1A and 1B, the structure and operation of an image forming apparatus 100 according to the present embodiment will now be explained. FIG. 1A is a schematic cross-sectional view of the image forming apparatus 100. FIG. 1B is a schematic enlarged view of the neighborhood of a photosensitive drum 1a in the cross section of the image forming apparatus 100 illustrated in FIG. 1A. The image forming apparatus 100 of the present embodiment includes first to fourth image forming stations Sta, Stb, Stc, and Std. Each image forming station forms a toner image using a toner of the corresponding color as a developer. Specifically, the first image forming station Sta corresponds to yellow (Y). The second image forming station Stb, the third image forming station Stc, and the fourth image forming station Std correspond to magenta (M), cyan (C), and black (Bk), respectively. The image forming operation and structure of each image forming station is the same as the image forming operation and structure of the others. They are different from one another only in the colors of the toner images formed. Therefore, the first image forming station Sta is described below as a representative example of image forming stations St. Since the other stations are similar to the first image forming station Sta, they are not explained.

The first image forming station Sta includes a photosensitive drum 1a, which is a drum-shaped electrophotographic photosensitive member, a charging roller 2a (e.g., charging member), an exposure unit 3a (e.g., exposure unit), a developing device 4a (e.g., developing voltage applying unit), and a cleaning device 6a.

Operation of Image Forming Apparatus

Under operation control by a control unit 70 (e.g., control unit), the image forming apparatus 100 executes an image forming process of forming an image corresponding to received image data on a sheet-shaped recording medium P such as paper. During the execution of the image forming process, as illustrated in FIG. 1A, the photosensitive drum 1a is driven to rotate at a predetermined peripheral speed (process speed) in a direction indicated by an arrow. During the rotation, first, the photosensitive drum 1a is uniformly charged into predetermined polarity/potential by the charging roller 2a at a charging position CP illustrated in FIG. 1B. Next, the photosensitive drum 1a is exposed at an exposure position EP illustrated in FIG. 1B by light L emitted from the exposure unit 3a. This exposure produces an electrostatic latent image corresponding to the yellow color component of a color image that is to be formed. Next, the electrostatic latent image is developed by a developing roller 5a of the developing device 4a at a developing position DP illustrated in FIG. 1B to be visualized as a yellow toner image corresponding to the image data.

An intermediate transfer belt 10 is stretched around belt-supporting-and-tensioning members 11, 12, and 13. The intermediate transfer belt 10 is driven to turn at approximately the same peripheral speed as the peripheral speed of the photosensitive drum 1a in a belt-moving direction that is not against the rotating direction of the photosensitive drum 1a while being locally in contact with the photosensitive drum 1a. At a primary transfer nip, which is the position of contact of the photosensitive drum 1a and the intermediate transfer belt 10 with each other, the yellow toner image formed on the surface of the photosensitive drum 1a is transferred onto the intermediate transfer belt 10 by a primary transfer voltage applied to a primary transfer roller 14a by a primary transfer power source 15a. This process is called as primary transfer. Residual primary transfer toner, which remains on the surface of the photosensitive drum 1a after the primary transfer, is cleaned off by the cleaning device 6a, to be ready for a next image forming process that begins with charging.

Magenta, cyan, and black toner images are formed respectively at the second, third, and fourth image forming stations Stb, Stc, and Std in a similar fashion. These toner images are sequentially transferred onto the intermediate transfer belt 10 one on another. A CMYK color image corresponding to the image data is obtained in this way.

There is a secondary transfer nip between the intermediate transfer belt 10 and a secondary transfer roller 20. The recording medium P fed by a feeder roller 50 is conveyed to the secondary transfer nip. The toner images of the four colors on the intermediate transfer belt 10 are transferred together onto the surface of the recording medium P at the secondary transfer nip by a secondary transfer voltage applied to the secondary transfer roller 20 by a secondary transfer power source 21. This process is called as secondary transfer. After that, the recording medium P bearing the toner images of the four colors thereon is conveyed into the fixing device 30. Heat and pressure applied thereat cause the toners of the four colors to melt, resulting in becoming fixed to the recording medium P. This process is called as fixing. A full-color print image corresponding to the image data is formed through the above series of operations, and the image forming process ends.

Residual secondary transfer toner, which remains on the surface of the intermediate transfer belt 10 after the secondary transfer, is cleaned off by an intermediate transfer belt cleaning device 16.

In monochrome printing, a toner image is formed on the photosensitive drum 1d only, and the toner image is transferred from the photosensitive drum 1d onto the intermediate transfer belt 10, through the same steps as those described above. Then, the toner image on the intermediate transfer belt 10 is secondarily transferred onto the recording medium P at the secondary transfer nip, followed by fixing at the fixing device 30. The process in the monochrome case is executed in this way.

Structure of Image Forming Unit

Next, the structure of an image forming unit according to the present embodiment will now be explained. The photosensitive drum 1a, which is the central component in the image forming process, is an organic photosensitive drum that has a coating of a functional film including an undercoat layer, a carrier generation layer, and a carrier transfer layer in this order on the outer circumferential surface of a cylinder made of aluminum.

A laser scanner 3a, which is an example of an exposure unit, is configured to form an electrostatic latent image by applying a laser beam to the photosensitive drum 1a and by selectively exposing the surface of the photosensitive drum 1a. Specifically, the laser scanner 3a forms an electrostatic latent image by driving a laser diode in accordance with an emission signal, which is generated by processing an image signal by a data control unit. The structure of the laser scanner 3a will be described later.

The charging roller 2a, which is an example of a charging member, is a so-called elastic charging roller that has an elastic layer on a metal core. The charging roller 2a rotates as a slave roller while being pressed in contact with the photosensitive drum 1a. The surface of the photosensitive drum 1a at the charging position CP is in contact with the charging roller 2a. In a charging process, a predetermined direct current voltage for charging the photosensitive drum 1a is applied to the metal core of the charging roller 2a. As a result of the application of this voltage, after-charging potential is generated on the surface of the photosensitive drum 1a. The photosensitive drum 1a is exposed by the laser beam emitted from the laser scanner 3a. At the exposed part of the photosensitive drum 1a, electric charges disappear on the surface due to carriers generated from the carrier generation layer, resulting in a decrease in potential. Since an emission signal for emitting a laser beam is generated on the basis of image data, the region of bright potential V1 and the region of dark potential Vd corresponding to the image data are formed and, therefore, an electrostatic latent image corresponding to the image data is formed on the photosensitive drum 1a. The surface of the photosensitive drum 1a at the exposure position EP is irradiated with the laser beam emitted by the laser scanner 3a.

The developing roller 5a, which is an example of a developing member, is a so-called elastic developing roller that has an elastic layer on a metal core. The developing roller 5a and the photosensitive drum 1a rotate such that the roller's surface and the drum's surface move rotationally not against each other (i.e., rotate in a forward direction in relation to each other) at the region where they face each other. The developing roller 5a is in contact with the photosensitive drum 1a, with a predetermined contact width, for image forming operation. The developing roller 5a is driven to rotate at a peripheral speed that is higher than the peripheral speed of the photosensitive drum 1a.

It is possible to switch the state of the developing roller 5a and the photosensitive drum 1a between a contact state and a separated state by a developing contact/separation switching mechanism 60 described later. That is, the body of the image forming apparatus 100 includes the developing contact/separation switching mechanism 60 configured to move the developing roller 5a between a contact position at which the developing roller 5a is in contact with the photosensitive drum 1a (an example of a first position) and a separated position at which the developing roller 5a is separated from the photosensitive drum 1a (an example of a second position). The developing contact/separation switching mechanism 60 sets the developing roller 5a at the contact position during the operation of forming an image and sets the developing roller 5a at the separated position when the image forming apparatus 100 is not operating, for example, when in a standby state. At the developing position DP, the photosensitive drum 1a is in contact with the developing roller 5a.

During the operation of forming an image, a predetermined direct current voltage is applied to the metal core of the developing roller 5a for setting its potential at developing potential. A toner charged negatively due to triboelectrification is borne thereon. Due to the difference between the surface potential of the photosensitive drum 1a and the potential of the developing roller 5a, the toner transfers onto the region of bright potential only to visualize the electrostatic latent image when the developing roller 5a is held at the contact position. The toner used is a non-magnetic monocomponent toner. As described above, the contact position of the developing roller 5a is the position for putting the toner onto the photosensitive drum 1a. When the developing roller 5a is held at the separated position, it is impossible to put the toner onto the photosensitive drum 1a because the distance between the photosensitive drum 1a and the developing roller 5a is long enough to prevent it. That is, the separated position of the developing roller 5a is the position for putting no toner onto the photosensitive drum 1a.

Structure of Exposure Unit

Figure 2:
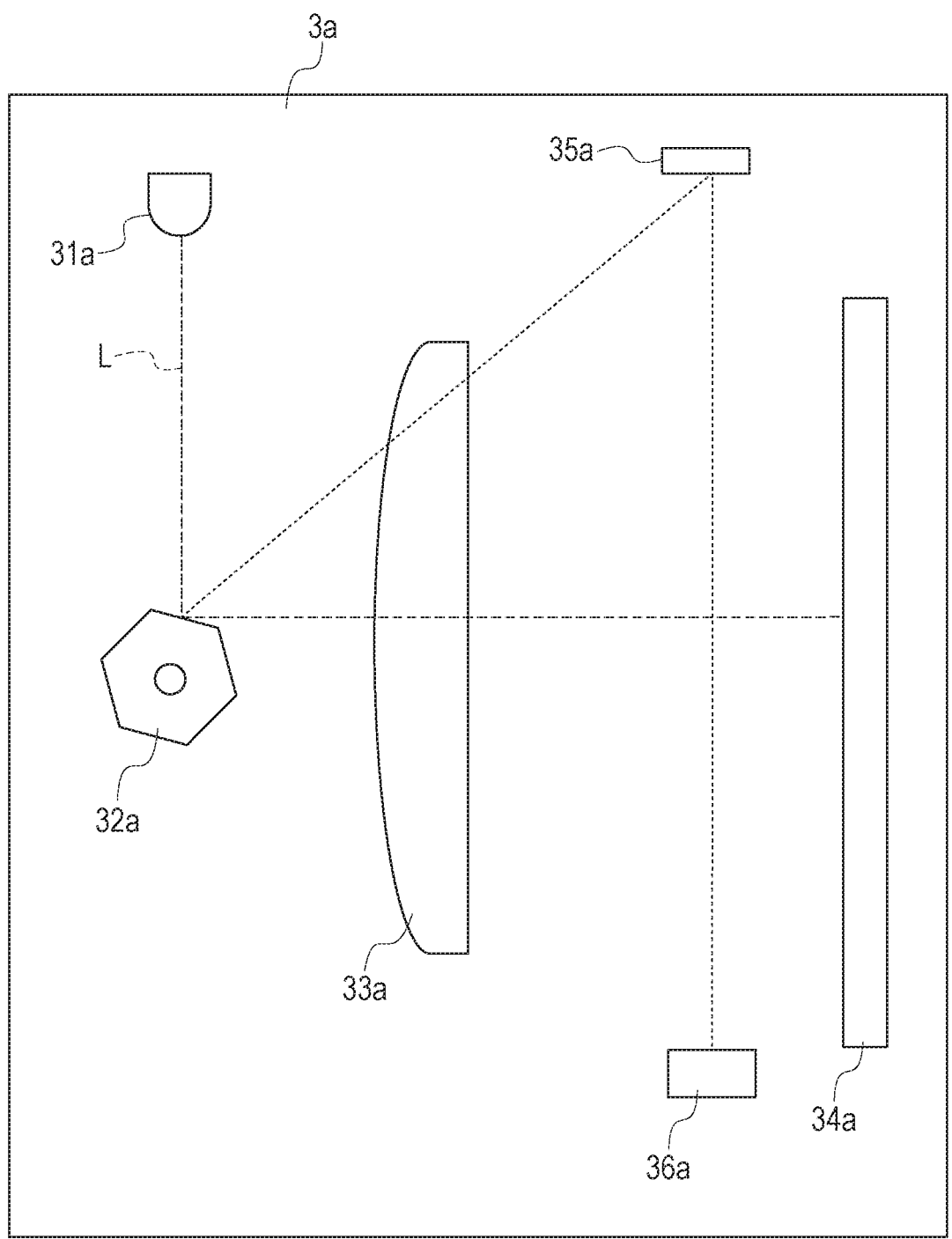
FIG. 2 is a diagram illustrating the structure of an exposure unit.

Taking the first image forming station Sta as an example, next, the structure of the laser scanner that is the exposure unit 3a of the present embodiment will now be explained. FIG. 2 is a diagram for explaining the schematic structure of the exposure unit. Laser light emitted from a light source unit 31a (i.e., light source unit), which is a laser unit, is reflected by a mirror 32a, which is a rotating polygon driven to rotate by a non-illustrated scanner motor. The reflected light passes through an fθ lens 33a, is reflected by a mirror 34a, and then reaches the surface of the photosensitive drum 1a. Due to rotation of the polygon mirror 32a, the direction of reflection of the laser light by the polygon mirror 32a changes continuously. Accordingly, a laser light spot formed on the surface of the photosensitive drum 1a moves in a main scan direction, which is the rotating axial direction of the photosensitive drum 1a. By moving a laser light spot in this way, it is possible to perform scanning using laser light. Laser light reflected into a particular angular region by the polygon mirror 32a does not reach the surface of the photosensitive drum 1a. Laser light reflected into some part of the particular angular region is reflected by a BD (beam detection) mirror 35a. The reflected light is received by a BD sensor 36a (i.e., light receiving unit), which is an example of a light receiving unit. The BD sensor 36a outputs a signal based on the receiving of the laser light. The output signal from the BD sensor 36a is taken as a reference for synchronization of a write signal for each scanning, thereby making an adjustment for ensuring no shift in write position that is the position of exposure start by a laser light spot on the surface of the photosensitive drum 1a. The output signal from the BD sensor 36a is used also for controlling the rotation of the scanner motor described later. The polygon mirror 32a and the BD sensor 36a, etc. may be shared with the other exposure units 3b, 3c, and 3d.

The laser unit 31a includes a semiconductor laser that is a light source, a collimator lens that is bonded to a collimator lens barrel, and a laser drive circuit board that supplies an electric current needed for emission of the semiconductor laser to control emission ON/OFF. The semiconductor laser includes an edge-emitting laser chip and photodiode.

To optically adjust the amount of light emitted by the semiconductor laser, laser light amount control (Automatic Power Control, hereinafter abbreviated as APC) is performed as follows: a part of laser light is detected by a photoreceptor; then, the amount of a drive current flowing through the laser diode is changed on the basis of the detection result. The APC is performed before the operation of forming an image so that the amount of laser light will be kept constant, thereby preventing image instability due to a change in ambient conditions, laser variations or deterioration.

Figure 3:
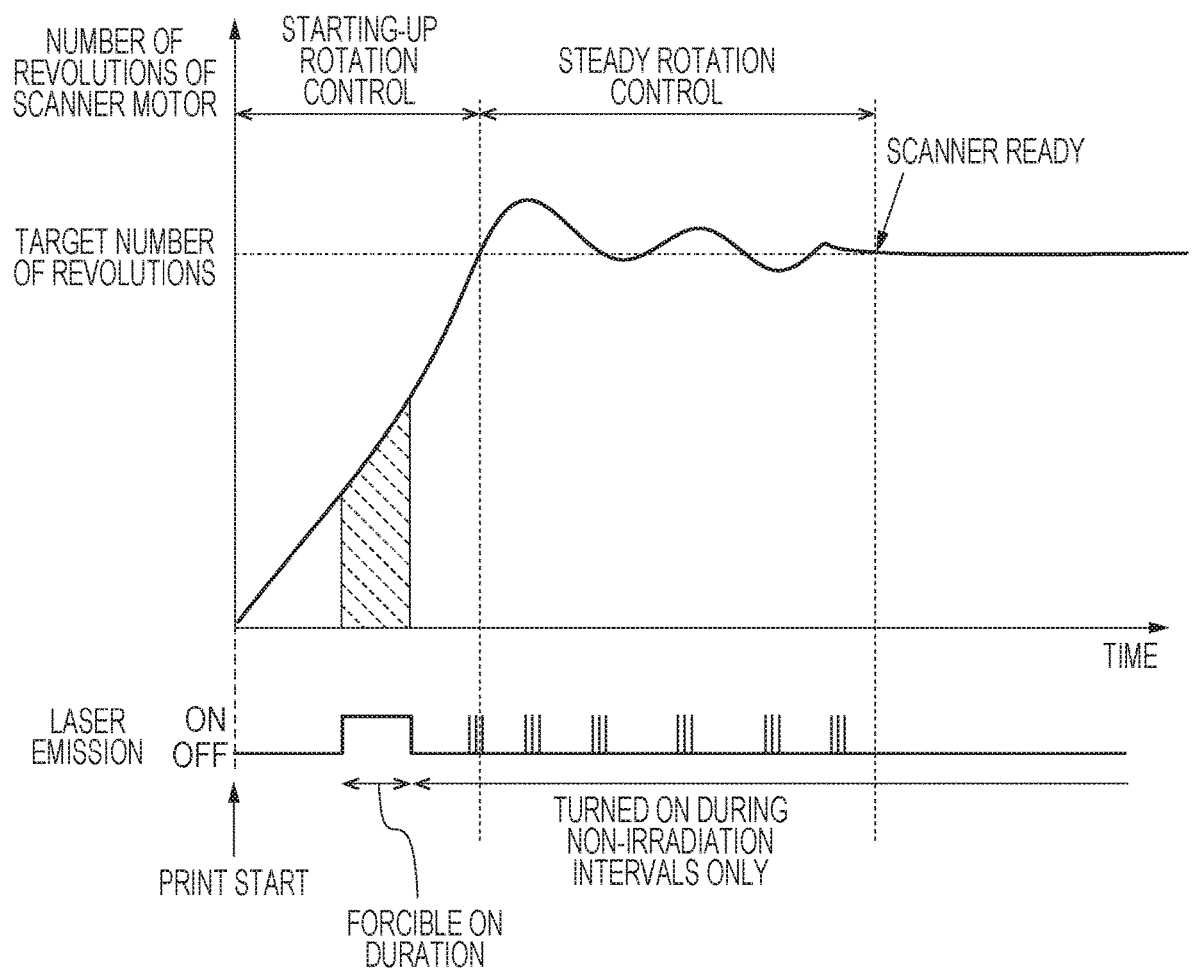
FIG. 3 is a diagram illustrating the starting-up control of a scanner motor.

Next, the control of the exposure unit 3a described above will now be explained. The operation of the exposure unit 3a is controlled by the control unit 70. FIG. 3 is a timing chart that illustrates a print sequence according to the present embodiment. The vertical axis in the graph shown at the upper part of FIG. 3 represents the number of revolutions of the scanner motor, and the horizontal axis represents time. The lower part of FIG. 3 illustrates a laser emission state.

A print start command is sent from an external apparatus such as a personal computer to the image forming apparatus 100. Receiving the command, the image forming apparatus 100 performs starting-up rotation control of the scanner motor. In the starting-up rotation control, the scanner motor is operated to rotate the polygon mirror 32a, and an acceleration signal is sent to the scanner motor for acceleration such that the rotation speed of the polygon mirror 32a will reach a speed within a predetermined rotation speed range. The number of revolutions of the scanner motor coincides with the number of revolutions of the polygon mirror 32a.

After the start of the rotating operation of the polygon mirror 32a, the laser is forcibly turned ON for a predetermined length of time. In the forcible ON duration, that is, the predetermined length of time for which the laser is forcibly turned ON, the APC mentioned above is performed to control the amount of laser light, and, after the stabilization of the amount of laser light, the number of revolutions of the polygon mirror 32a is detected using the BD sensor 36a for the starting-up rotation control. The laser is forcibly turned OFF at the end of the forcible ON duration. The forcible ON duration is preset to have such a length of time that, during the execution of the starting-up rotation control, the laser light reflected by the polygon mirror 32a that is rotating enters the BD sensor 36a as incident light more than once. Therefore, by calculating the cycle of the timing of detection of the laser light by the BD sensor 36a, it is possible to know a value corresponding to the number of revolutions of the polygon mirror 32a. In the forcible ON duration, the laser light reflected by the polygon mirror 32a is applied to the surface of the photosensitive drum 1a and to the BD sensor 36a.

The starting-up rotation control continues. That is, the laser is turned ON again after having been forcibly turned OFF for a predetermined length of time after the forcible ON duration. However, in this operation, the laser is turned ON during non-irradiation intervals only. The "non-irradiation interval" means time other than time during which the laser light reflected by the polygon mirror 32a reaches the surface of the photosensitive drum 1a. Therefore, exposure of the photosensitive drum 1a does not occur as long as laser light is emitted during the non-irradiation intervals only. Though the laser is turned ON during the non-irradiation intervals only as described above, laser light is applied to the BD sensor 36a. Therefore, the number of revolutions of the polygon mirror 32a is detectable using the BD sensor 36a.

Then, it is determined whether or not the number of revolutions detected in this way has reached a preset target number of revolutions, at which it becomes possible to form an image. If the number of revolutions of the polygon mirror 32a has not reached the preset number of revolutions yet, after waiting for a predetermined length of time while further accelerating the scanner motor, the laser is forcibly turned ON again, the number of revolutions of the polygon mirror 32a is measured, and, then, the laser is forcibly turned OFF.

The starting-up rotation control of the scanner motor finishes when the number of revolutions of the polygon mirror 32a reaches the target number of revolutions illustrated in FIG. 3. Next, steady rotation control of the scanner motor begins upon completion of the starting-up rotation control of the scanner motor. In the steady rotation control of the scanner motor, control for causing the rotation speed of the polygon mirror 32a to converge into a speed within a predetermined speed range, the center of which corresponds to the target number of revolutions, and for keeping at the converged rotation speed, is performed while monitoring the number of revolutions of the polygon mirror 32a. Upon attaining a convergence of the rotation speed of the polygon mirror 32a into the speed within the predetermined speed range through the steps described above, the preparation for forming an electrostatic latent image on the surface of the photosensitive drum 1a finishes. This preparation-completed state is called as "scanner ready". The above-described process of causing the rotation speed of the polygon mirror 32a to converge into a speed within a predetermined rotation speed range by the steady rotation control after the starting-up rotation control is defined as an example of a first speed adjustment process (e.g., a process for adjusting the rotation speed of the polygon mirror 32a into a rotation speed within a desired speed range).

The laser is turned ON during non-irradiation intervals only in the above-described steady rotation control, too. Therefore, no toner is put onto the photosensitive drum 1a though the developing roller 5a that has developing potential due to applying of a voltage from a developing bias power source is brought into contact with the surface of the photosensitive drum 1a that has passed through the exposure position during the period in which laser light is emitted during the non-irradiation intervals only.

Next, exposure of a non-image portion for generating charging potential for the photosensitive drum 1a will now be explained. In the present embodiment, when an electrostatic latent image corresponding to image data is formed by the exposure unit 3a, a non-image portion, which is an area where no toner is to be put on the surface of the photosensitive drum 1a, is exposed uniformly by micro-exposure. This process is called as "non-image portion exposure". By this means, the potential of the non-image portion on the surface of the photosensitive drum 1a is controlled. That is, bright potential V1, which is potential for putting a toner, is generated by exposing an image portion, which is an area on the surface of the photosensitive drum 1a where a toner is to be put and where an electrostatic latent image is formed.

Dark potential Vd, which is potential for putting no toner, is generated by exposing a non-image portion on the surface of the photosensitive drum 1a.

Figure 4:
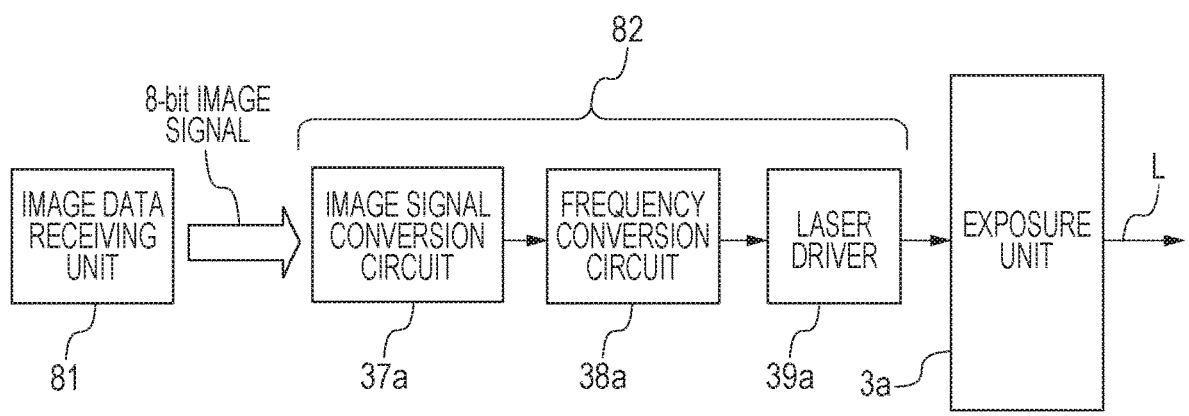
FIG. 4 is a diagram illustrating the emission control of the exposure unit.

FIG. 4 is a diagram that illustrates the emission control of the exposure unit 3a. The image forming apparatus 100 includes an image data receiving unit 81 (i.e., acquisition unit) that receives image data sent from an external device such as a computer. Receiving the image data, the image data receiving unit 81 sends the image data to an emission signal generation unit 82. The image data sent from the image data receiving unit 81 is a multi-level signal that has 8 bits=256 grayscale in a depth direction. The grayscale is expressed as 0 to 255. Laser light is OFF when the multi-level signal is 0. Laser light is fully ON when the multi-level signal is 255. Laser light has a halftone therebetween temporally when the multi-level signal has any value from 1 to 254. It is possible to set the level of non-image portion exposure arbitrarily by using the level of the multi-level signal. In the description below, it is assumed that non-image portion exposure is performed using level 32 as the level of the multi-level signal. For a non-image portion, conversion into level 32 is performed by an image signal conversion circuit 37a for an image signal of 0 sent from the image data receiving unit 81, and compression conversion into level 33 to level 255 is performed for an image signal of 1 to 255. After that, the signal is converted into a serial time-axis direction signal by a frequency conversion circuit 38a to be used for pulse width modulation of each dot pulse having a resolution of 600 dots per inch in the present embodiment.

A laser driver 39a is driven by this signal to emit light L. The emitted light L goes through the exposure unit 3a including the polygon mirror 32a, the fθ lens 33a, and the mirror 34a to be applied to the photosensitive drum 1a as scanning light. In the present embodiment, as described above, the image signal conversion circuit 37a performs conversion into level 32 in a case where an image signal sent from the image data receiving unit 81 has a value 0, and compression conversion into level 33 to level 255 in a case of 1 to 255. However, the method of conversion is not limited to this example. For example, all of image signals of 0 to 32 from the image data receiving unit 81 may be converted into 32, and image signals of 33 to 255 may be processed without conversion. Alternatively, 32 may be added to all of image signals from the image data receiving unit 81, wherein all of those exceeding 255 are replaced with 255.

Developing Contact/Separation Switching Mechanism

Figure 11A:
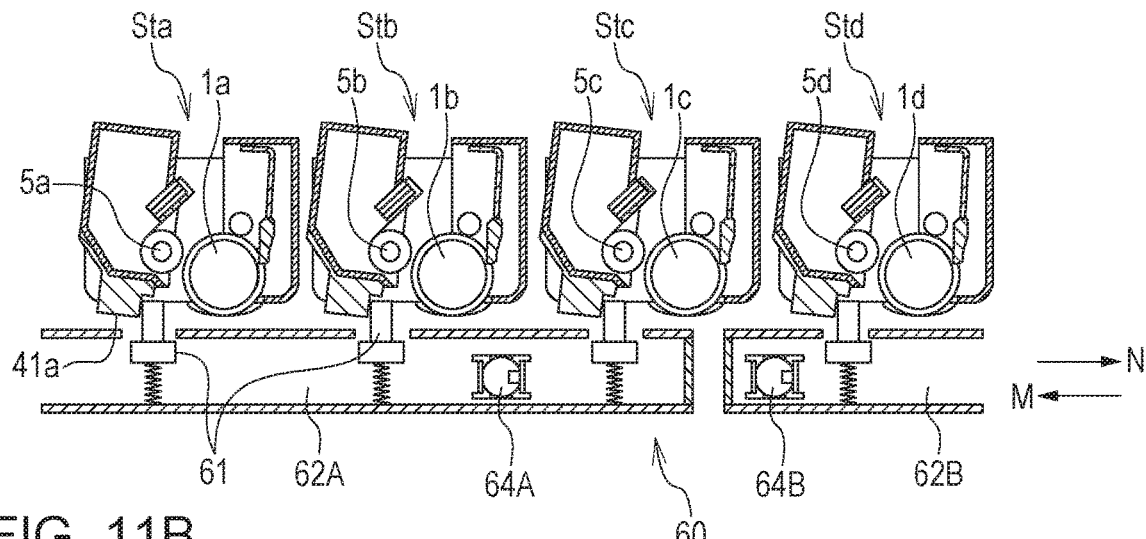
FIG. 11A is a diagram illustrating a developing contact/separation switching mechanism.
Figure 11B:
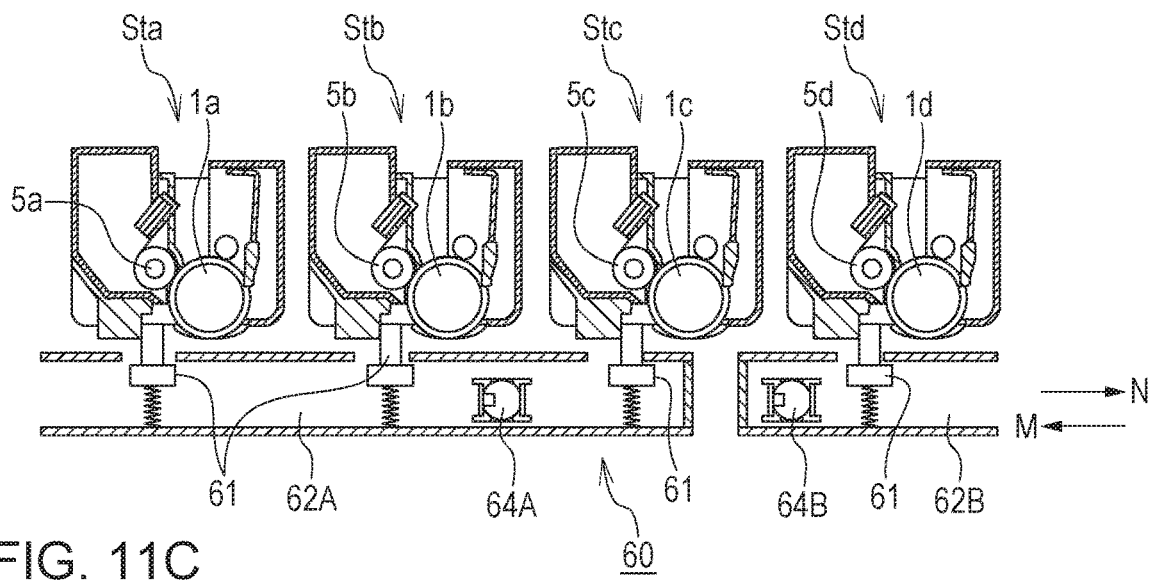
FIG. 11B is a diagram illustrating a developing contact/separation switching mechanism.
Figure 11C:
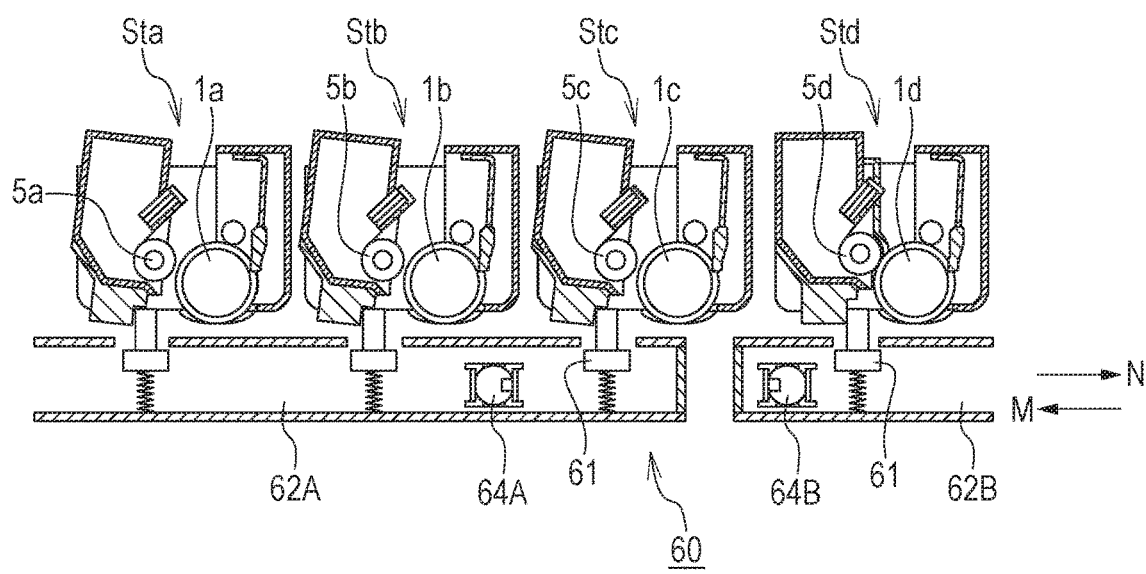
FIG. 11C is a diagram illustrating a developing contact/separation switching mechanism.
Figure 12:
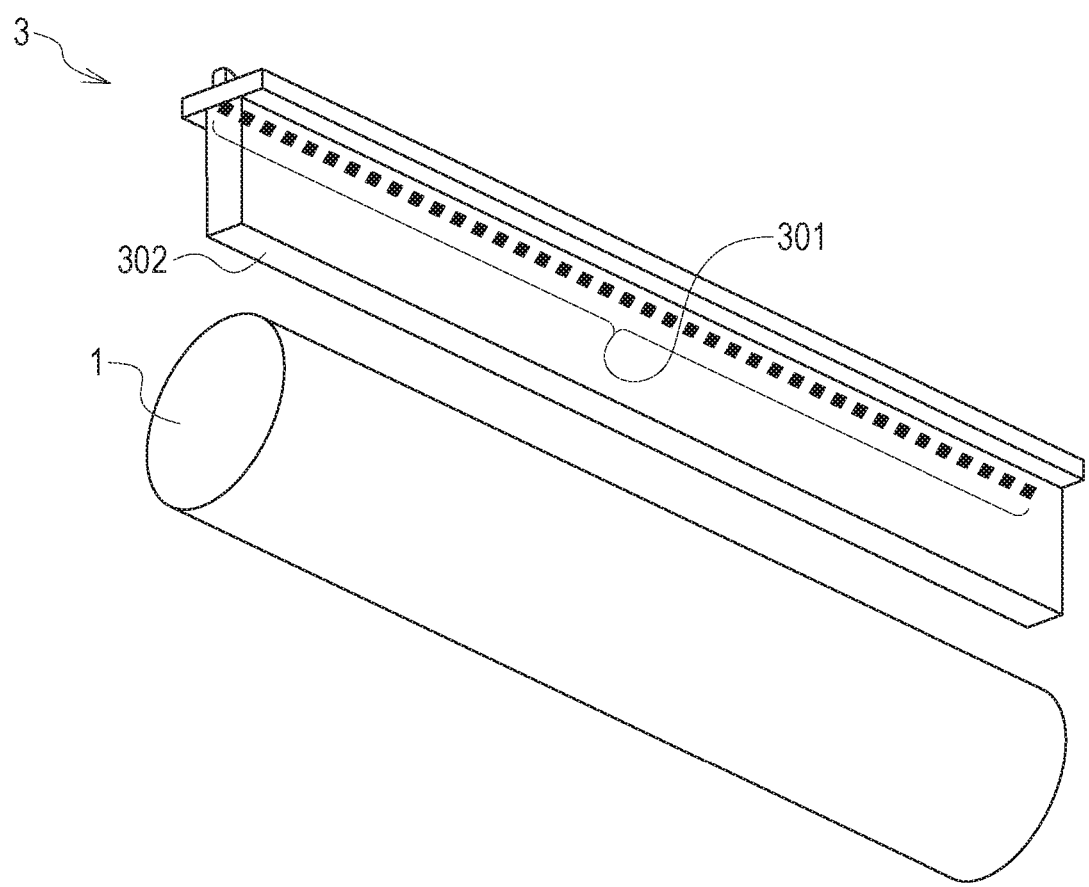
FIG. 12 is a diagram illustrating an exposure unit.

Next, the developing contact/separation switching mechanism 60 (i.e., moving member) will now be explained. FIGS. 11A, 11B, and 11C illustrate the developing contact/separation switching mechanism 60, specifically, an "all-separated" state, a color image forming state, and a monochrome image forming state, respectively. The developing contact/separation switching mechanism 60 is controlled by the control unit 70 and includes a non-illustrated motor for rotating a cam 64A to operate a slider 62A, and a cam 64B to operate a slider 62B. The slider 62A has contact members 61. The slider 62B has a contact member 61. Each of the contact members 61 is configured to be in contact with the corresponding one of frames 41a, 41b, 41c, and 41d of the developing devices 4a, 4b, 4c, and 4d. Each of the frames 41a, 41b, 41c, and 41d supports the corresponding one of the developing rollers 5a, 5b, 5c, and 5d rotatably. Each of the developing rollers 5a, 5b, 5c, and 5d is urged toward the corresponding one of the photosensitive drums 1a, 1b, 1c, and 1d by the corresponding one of non-illustrated urging members.

Each slider 62A, 62B is able to move in an M/N direction illustrated in FIG. 11A by being pushed by the cam 64A, 64B driven by the non-illustrated motor. As illustrated in FIG. 11A, each of the contact members 61 pushes the corresponding one of frames 41a, 41b, 41c, and 41d of the developing devices 4a, 4b, 4c, and 4d while being in contact therewith to cause the corresponding one of frames 41a, 41b, 41c, and 41d to rotate against an urging force applied by the non-illustrated urging member when both of the sliders 62A and 62B move in the M direction due to the rotation of the cams 64A and 64B. As a result, each of the developing rollers 5a, 5b, 5c, and 5d becomes separated from the corresponding one of the photosensitive drums 1a, 1b, 1c, and 1d. When in this state, each of the developing rollers 5a, 5b, 5c, and 5d is located at the separated position. This state is an "all-separated" state. The developing contact/separation switching mechanism 60 is controlled by the control unit 70 such that the image forming apparatus 100 that is on standby is in the all-separated state.

Each of the developing rollers 5a, 5b, 5c, and 5d moves toward the corresponding one of the photosensitive drums 1a, 1b, 1c, and 1d due to the urging force applied by the non-illustrated urging member when both of the sliders 62A and 62B move in the N direction due to the rotation of the cams 64A and 64B from this state. The movement results in a state of contact of each of the developing rollers 5a, 5b, 5c, and 5d at the contact position with the corresponding one of the photosensitive drums 1a, 1b, 1c, and 1d as illustrated in FIG. 11B. This state is a color image forming state, in which it is possible to put a toner onto each of the photosensitive drums 1a, 1b, 1c, and 1d. The developing contact/separation switching mechanism 60 is controlled by the control unit 70 such that the image forming apparatus 100 is in the color image forming state when a color image is formed using toners of the four colors. A toner is on the surface of each of the developing rollers 5a, 5b, 5c, and 5d. Therefore, to be exact, the state of contact of each of the developing rollers 5a, 5b, 5c, and 5d with the corresponding one of the photosensitive drums 1a, 1b, 1c, and 1d means a state in which each of the developing rollers 5a, 5b, 5c, and 5d is in contact with the corresponding one of the photosensitive drums 1a, 1b, 1c, and 1d with a toner therebetween.

The developing roller 5d moves toward the photosensitive drum 1d due to the urging force applied by the non-illustrated urging member when the slider 62B only moves in the N direction due to the rotation of the cam 64B from the above-described all-separated state. The movement results in a state of contact of the developing roller 5d at the contact position with the photosensitive drum 1d, whereas the developing rollers 5a, 5b, and 5c are at the separated position, as illustrated in FIG. 11C. This state is a monochrome image forming state, in which it is possible to put a toner onto the photosensitive drum 1d. The developing contact/separation switching mechanism 60 is controlled by the control unit 70 such that the image forming apparatus 100 is in the monochrome image forming state when a monochrome image is formed using a black toner.

Potential Setting of Photosensitive Drum when Image is Formed

Next, the potential setting of the photosensitive drum 1a according to the present embodiment, when an image is formed, will now be explained. If the potential of the developing roller 5a is defined as developing potential Vdc, the potential of the photosensitive drum 1a for forming an image is set as follows. That is, it is set at such a value that a toner charged into normal polarity (negative in the present embodiment) will transfer onto an image portion only, which is the region of the bright potential V1, due to the difference between the developing potential Vdc and the bright potential V1 at the developing position where the developing roller 5a is in contact with the surface of the photosensitive drum 1a. In addition, it is set at such a value that a toner charged into normal polarity will not transfer onto a non-image portion, which is the region of the dark potential Vd, due to the difference between the developing potential Vdc and the dark potential Vd at the developing position where the developing roller 5a is in contact with the surface of the photosensitive drum 1a. A phenomenon of transferring of a toner onto a non-image portion is called as fogging. The difference between the dark potential Vd of the photosensitive drum 1a and the potential Vdc of the developing roller 5a is called as back contrast (denoted as Vback).

In the present embodiment, the dark potential Vd, which is the potential of the non-image portion of the photosensitive drum 1a, is set to be −500 V. Specifically, a direct current voltage of −1,200 V, which is a charging bias for forming an image (an example of a first charging voltage), is applied by a non-illustrated charging bias power source to the metal core of the charging roller 2a to charge the photosensitive drum 1a and set the "after-charging, before-exposure" potential of the photosensitive drum 1a into −700 V. After that, the potential of the photosensitive drum 1a is set into −500 V by performing non-image portion exposure described earlier. In the present embodiment, the bright potential V1, which is the potential of the image portion of the photosensitive drum 1a, is set to be −150 V. Specifically, the after-charging before-exposure potential of the photosensitive drum 1a is set into −700 V by charging by the charging roller 2a, to the metal core of which a direct current voltage of −1,200 V is applied, and the potential of the photosensitive drum 1a is thereafter set into −150 V by performing image portion exposure described earlier. The developing potential Vdc is generated by applying a direct current voltage of −350 V, which is a developing bias for forming an image (an example of a first developing voltage), to the metal core of the developing roller 5a by a non-illustrated developing bias power source. That is, the back contrast Vback is 150 V. The charging bias power source and the developing bias power source are controlled by the control unit 70.

In order to realize the potential setting described above, the amount of exposure per area on the surface of the photosensitive drum 1a by non-image portion exposure is set to be smaller than the amount of exposure per area on the surface of the photosensitive drum 1a by image portion exposure. In the present embodiment, switching of the amount of exposure between non-image portion exposure and image portion exposure is performed by pulse width modulation in 256 levels described above. Level 32 is assigned to non-image portion exposure, and any of level 33 to 255 is assigned to image portion exposure. The emission width of level 33 and higher is longer than the emission width of level 32. In the present embodiment, the emission width is controlled by adjusting the duration of emission.

However, the method for switching the amount of exposure between non-image portion exposure and image portion exposure is not limited to the above example. In the pulse width modulation described above, the amount of exposure per area is switched between non-image portion exposure and image portion exposure by modulating the emission pulse width to switch the level while keeping laser emission intensity constant. However, the following method may be used instead: a method of switching the amount of exposure per area between non-image portion exposure and image portion exposure by switching laser emission intensity by, for example, switching the value of a drive current applied to the semiconductor laser.

Potential Control of Photosensitive Drum when Scanner Motor is Started Up

Next, a preparation process executed before color image forming operation will now be explained. The preparation process is controlled by the control unit 70.

In the present embodiment, the developing roller 5 is brought into contact with the photosensitive drum 1 before the completion of starting up of the scanner motor, and a charging bias is controlled in such a way as to keep the back contrast Vback, which is the potential difference between the photosensitive drum 1 and the developing roller 5, at appropriate potential without performing non-image portion exposure. Below is a detailed explanation of this control. The first image forming station Sta is taken as an example.

Figure 5:
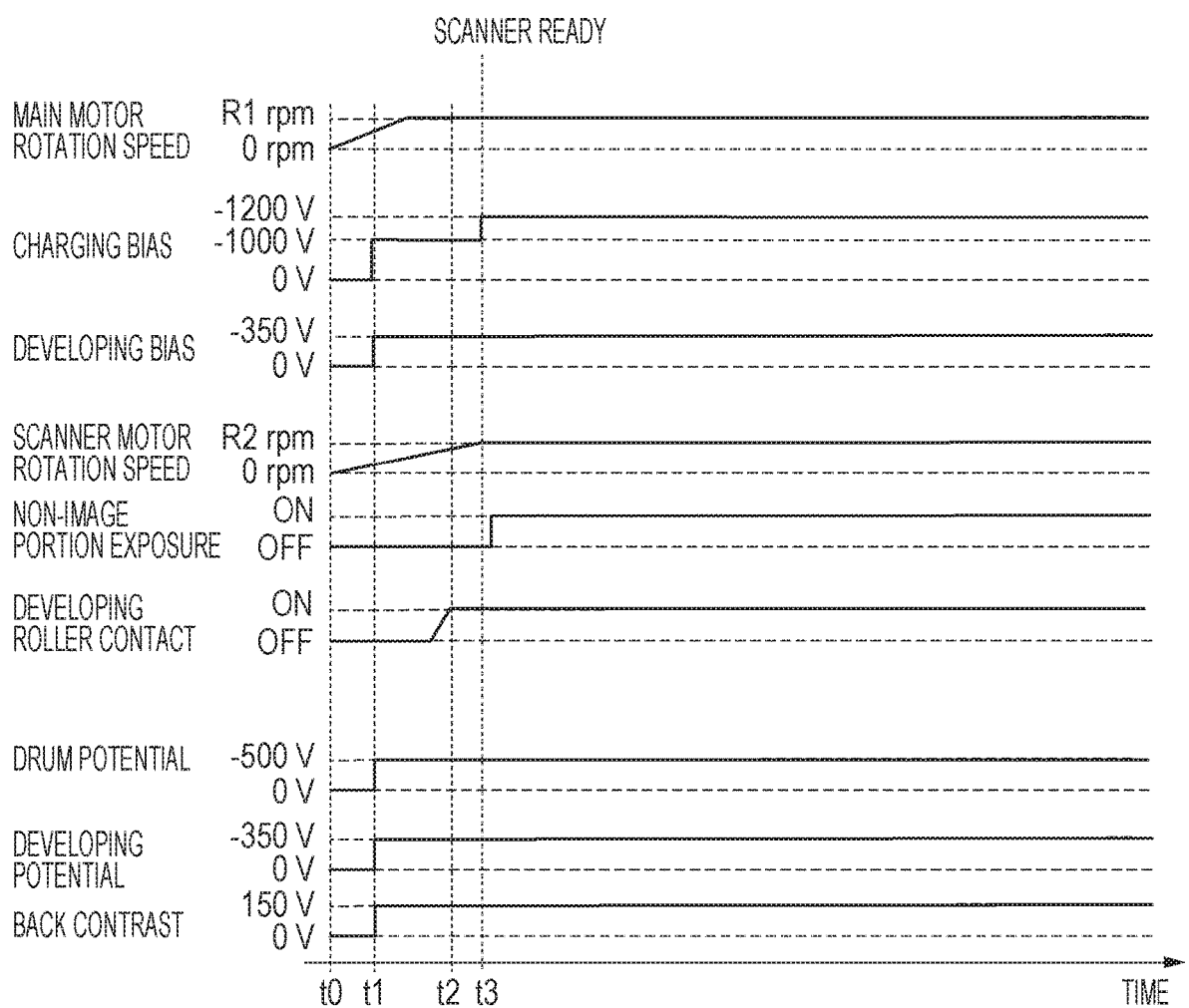
FIG. 5 is a timing chart of a preparation process.

FIG. 5 is a timing chart of a preparation process executed before color image forming operation. First, at a point in time t0, an image signal is received from the image data receiving unit 81, and the preparation process starts. A non-illustrated main motor for driving the photosensitive drum 1a and the intermediate transfer belt 10 starts to rotate, and the scanner motor also starts to rotate. Since the gear ratio of the main motor and the photosensitive drum 1a is fixed, the rotation speed of the photosensitive drum 1a is directly proportional to the rotation speed of the main motor.

After the start of rotation of the main motor, at a point in time t1, a voltage of −1,000V is applied as a charging bias during startup (an example of a second charging voltage) so as to charge the photosensitive drum 1a into −500 V. The second charging voltage described herein as a charging bias during startup is set to have the same polarity as normal charge polarity of a toner (i.e., negative polarity) and to have an absolute value that is less than the absolute value of the first charging voltage described herein as a charging bias for forming an image.

Drum surface potential generated by a charging bias depends solely on the potential difference between the photosensitive drum 1a and the charging roller 2a, not on the rotation speed of the photosensitive drum 1a. Therefore, it is all right to apply a charging bias during the process of accelerating the main motor to a steady speed R1 rpm. At the point in time t1, a developing bias for forming an image, −350 V, is applied to the developing roller 5a.

Next, at a point in time t2 after the completion of forcible ON duration in scanner control described earlier, the developing roller 5a is brought into contact with the surface of the photosensitive drum 1a. After APC control in the forcible ON duration, steady rotation control described earlier is performed so that the number of revolutions (speed) of the scanner motor will converge into a steady speed R2 rpm at a point in time t3, at which the scanner becomes ready, and the preparation process ends.

After "scanner ready", it is possible to perform non-image portion exposure. Therefore, at the point in time t3, switching from the charging bias during startup of −1,000 V, which is an example of the second charging voltage, to the charging bias for forming an image of −1,200 V, which is an example of the first charging voltage, is performed. By switching the charging bias, the absolute value of the surface potential of the photosensitive drum 1a is increased. Then, non-image portion exposure is performed at the timing of arrival, at the exposure position, of the portion charged using the charging bias of −1,200 V on the surface of the photosensitive drum 1a, thereby keeping the dark potential (Vd) of the photosensitive drum 1a at −500 V. This makes it possible to execute an image forming process for forming an image on the basis of image data while keeping the back contrast Vback, that is, the difference in surface potential between the developing roller 5a and the photosensitive drum 1a, constant at 150 V.

Hypothetically, if non-image portion exposure were performed before the completion of starting up of the scanner motor, the rotation speed of the polygon mirror 32a for reflecting laser light would not have reached a steady speed yet. Therefore, the amount of laser light reaching the surface of the photosensitive drum 1a would be unstable, making it impossible to obtain uniform potential on the surface of the photosensitive drum 1a. For this reason, exposure is performed by the exposure unit 3a after going into a scanner-ready state, in which the speed of the scanner motor is constant.

Comparison with Comparative Example

In the present embodiment, with the configuration described above, the back contrast Vback is kept at appropriate potential by controlling the charging bias before the completion of starting up of the scanner motor, during which it is impossible to perform non-image portion exposure.

Figure 6:
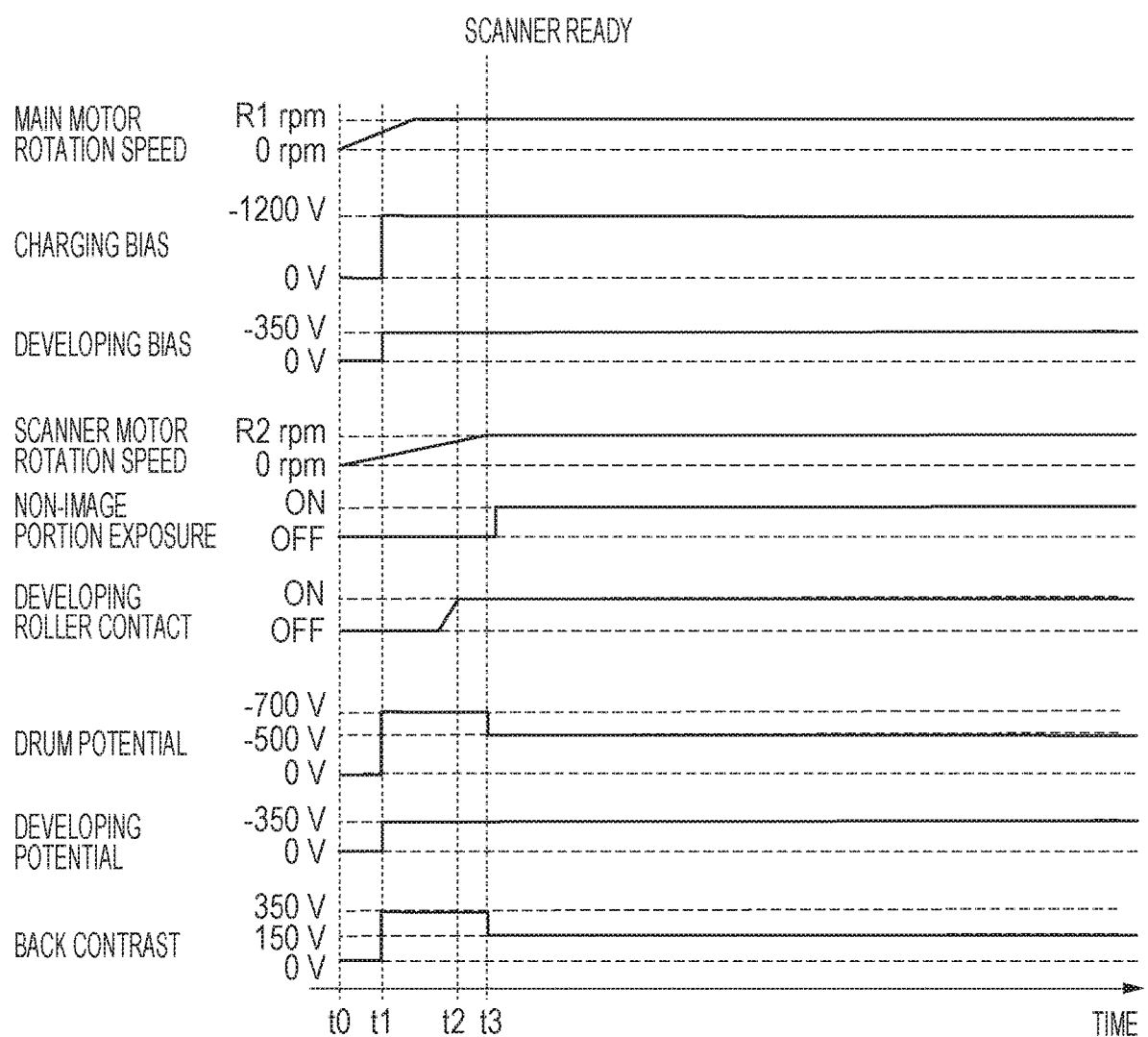
FIG. 6 is a timing chart of a preparation process according to a comparison example.

In a comparative example illustrated in FIG. 6, the charging bias remains the same at −1,200 V, which is a charging bias for forming an image, before and after the completion of starting up of the scanner motor. The developing bias also remains the same at −350 V, which is a developing bias for forming an image. Therefore, the dark potential Vd of the photosensitive drum 1a is −700 V during a period from t1 to t3 before scanner ready, during which it is impossible to perform non-image portion exposure. The dark potential Vd of the photosensitive drum 1a after scanner ready is −500 V due to a change from −700 V by non-image portion exposure. On the other hand, the developing potential Vdc is −350 V, similarly to the present embodiment, and, at the point in time t2 after the completion of forcible ON duration in scanner control, the developing roller 5a arrives at the developing position to be brought into contact with the surface of the photosensitive drum 1a. The back contrast Vback, which is the difference between the dark potential Vd of the photosensitive drum 1a and the developing potential Vdc, is 350 V before scanner ready, and 150 V after scanner ready. Therefore, there is a possibility of fog aggravation before scanner ready, that is, during the period of high back contrast Vback.

Figure 7:
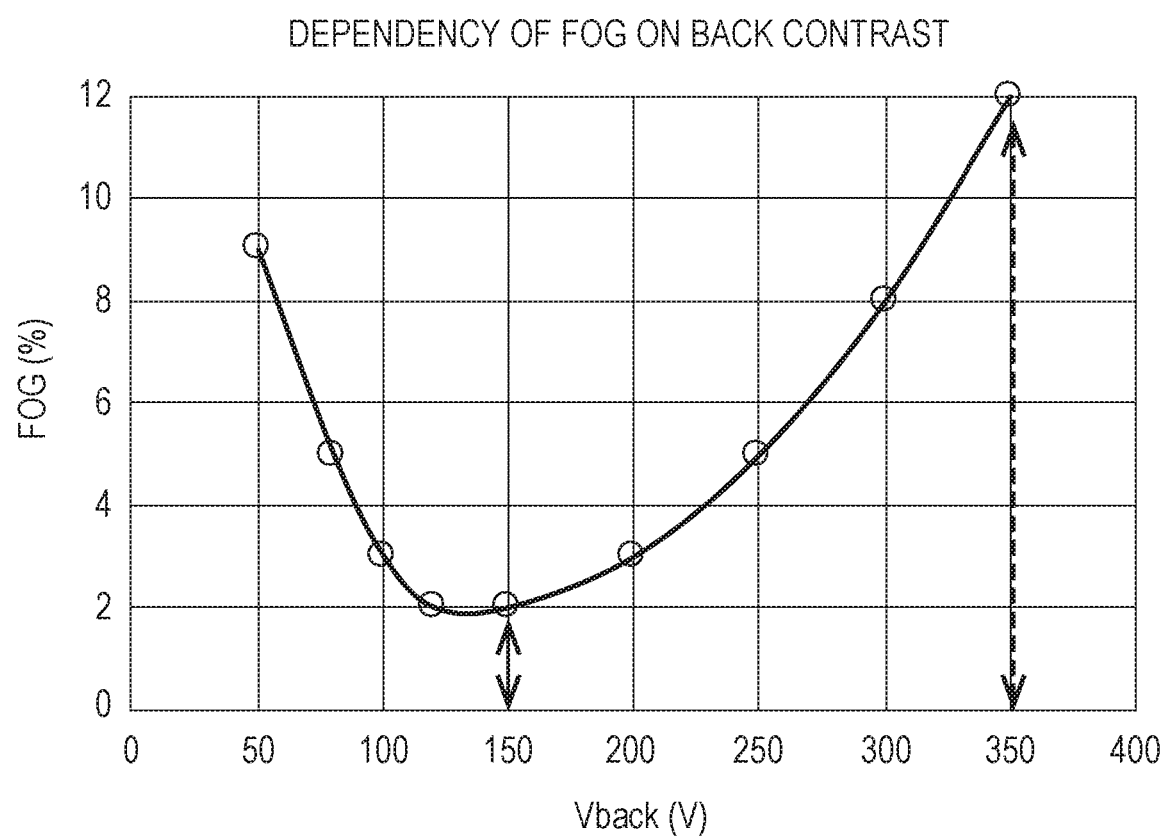
FIG. 7 is a graph showing a relationship between back contrast and fog.

The cause of fog aggravation will now be explained. FIG. 7 is a graph showing a relationship between the back contrast Vback and fog. Fog is measured as follows. Light is applied from an emitter to a measurement target surface (corresponding to the surface of the photosensitive drum 1a) that is a reflecting surface. Specular reflected light is received by a photoreceptor. Then, the amount of specular reflection is measured. If a large amount of toner is on the measurement target surface, it means that the amount of fog is large. The larger the amount of fog, the smaller the amount of specular reflection from the measurement target surface. Let S1 be the amount of specular reflection in a case where a toner is not on the measurement target surface. Let S2 be the amount of specular reflection in a case where a toner is on the measurement target surface. Given this definition, the value of fog K (%) can be expressed by the following formula:

$$K=(S1-S2)/S1\times100$$

As shown in FIG. 7, there is a significant correlation between the value of the back contrast Vback and the value of fog. If the back contrast Vback is low, the contrast between the developing potential Vdc and the dark potential Vd is low. The low contrast weakens an electric field that causes a toner to stay on the developing roller 5a. This tends to cause a fog aggravation. If the back contrast Vback is high, the contrast between the developing potential Vdc and the dark potential Vd is high, meaning a large difference between the developing potential Vdc and the dark potential Vd. Therefore, a toner of the opposite polarity (positive in the present embodiment) jumps onto the photosensitive drum 1a, which tends to cause a fog aggravation.

In a structure according to related art, the developing roller 5a is brought into contact in a state of high back contrast Vback before scanner ready. Therefore, wasteful toner consumption occurs due to aggravated fogging.

By contrast, in the present embodiment, the preparation process is controlled by the control unit 70 as follows. The developing roller 5a to which the developing bias for forming an image is applied arrives at the contact position when, on the surface of the photosensitive drum 1a, the portion charged by the charging roller 2a to which the charging bias during startup is applied is located at the developing position. That is, even before scanner ready, during which it is impossible to perform non-image portion exposure, the back contrast Vback is 150 V as illustrated in FIG. 5. This suppresses the occurrence of fogging.

As explained above, in a structure in which the developing roller 5a is brought into contact with the photosensitive drum 1a for which non-image portion exposure has not been performed before scanner ready, the present embodiment makes it possible to, by controlling the charging bias, keep the back contrast before scanner ready at a potential difference that suppresses the occurrence of fogging.

The second charging voltage described herein as the charging bias during startup in the preparation process does not necessarily have to be set such that the back contrast Vback is 150 V. Let V1 be back contrast that is the difference between the surface potential of the photosensitive drum 1a that has not been exposed by the exposure unit 3a after having been charged using the second charging voltage and the potential of the developing roller 5a to which the developing bias for forming an image is applied. Let V2 be back contrast that is the difference between the surface potential of the photosensitive drum 1a that has not been exposed by the exposure unit 3a after having been charged using the first charging voltage, which is described herein as the charging bias for forming an image, and the potential of the developing roller 5a to which the developing bias for forming an image is applied. The back contrast V2 is the back contrast 350 V of the comparative example. Given this definition, it is sufficient if the second charging voltage is set such that a relation of $|V1|<|V2|$ is satisfied between the absolute value of the back contrast V1 and the absolute value of the back contrast V2.

According to the study conducted by the inventors, if the amount of fog is approximately 3% or less, practically, it has almost no effect on image quality. As can be seen from FIG. 7, the amount of fog is approximately 3% or less within a range of ±60 V of "back contrast when an image is formed" (in FIG. 7, 150 V). Within this range, there is no decrease in image quality substantially. Let V3 be back contrast that is the difference between the surface potential of the photosensitive drum 1a for which non-image portion exposure has been performed by the exposure unit 3a after having been charged using the first charging voltage and the potential of the developing roller 5a to which the developing bias for forming an image is applied. The back contrast V3 is the back contrast when an image is formed. Therefore, it is advantageous if the back contrast V1 satisfies an equation of V1=V3±60 V.

The preparation process according to the present embodiment described above is a process before color image forming operation, and the first image forming station Sta is taken as an example in the above description. However, the preparation process may be a process before monochrome image forming operation. Specifically, in the monochrome case, the preparation process described above is executed similarly, with the replacement of the first image forming station Sta by the fourth image forming station Std.

As described above, the present embodiment makes it possible to avoid a toner from being transferred onto the surface of the photosensitive drum 1 even though the developing roller 5 is brought to the position for putting a toner onto the photosensitive drum 1 during the adjustment of the rotation speed of the polygon mirror 32. This prevents wasteful toner consumption from occurring due to aggravated fogging while reducing the FPOT by allowing the developing roller 5 to arrive at the position for putting a toner onto the photosensitive drum 1 during the adjustment of the rotation speed of the photosensitive drum 1.

Second Embodiment

In the structure of the image forming apparatus 100 according to the present embodiment, the same reference numerals are assigned to the same members as those of the first embodiment, and an explanation of them is omitted. The first image forming station Sta is taken as an example for explaining the image forming station St.

In the control described in the first embodiment, the charging bias is switched as a method for keeping the back contrast Vback constant before and after scanner ready. In the present embodiment, the back contrast Vback is kept constant by switching the developing bias.

Figure 8:
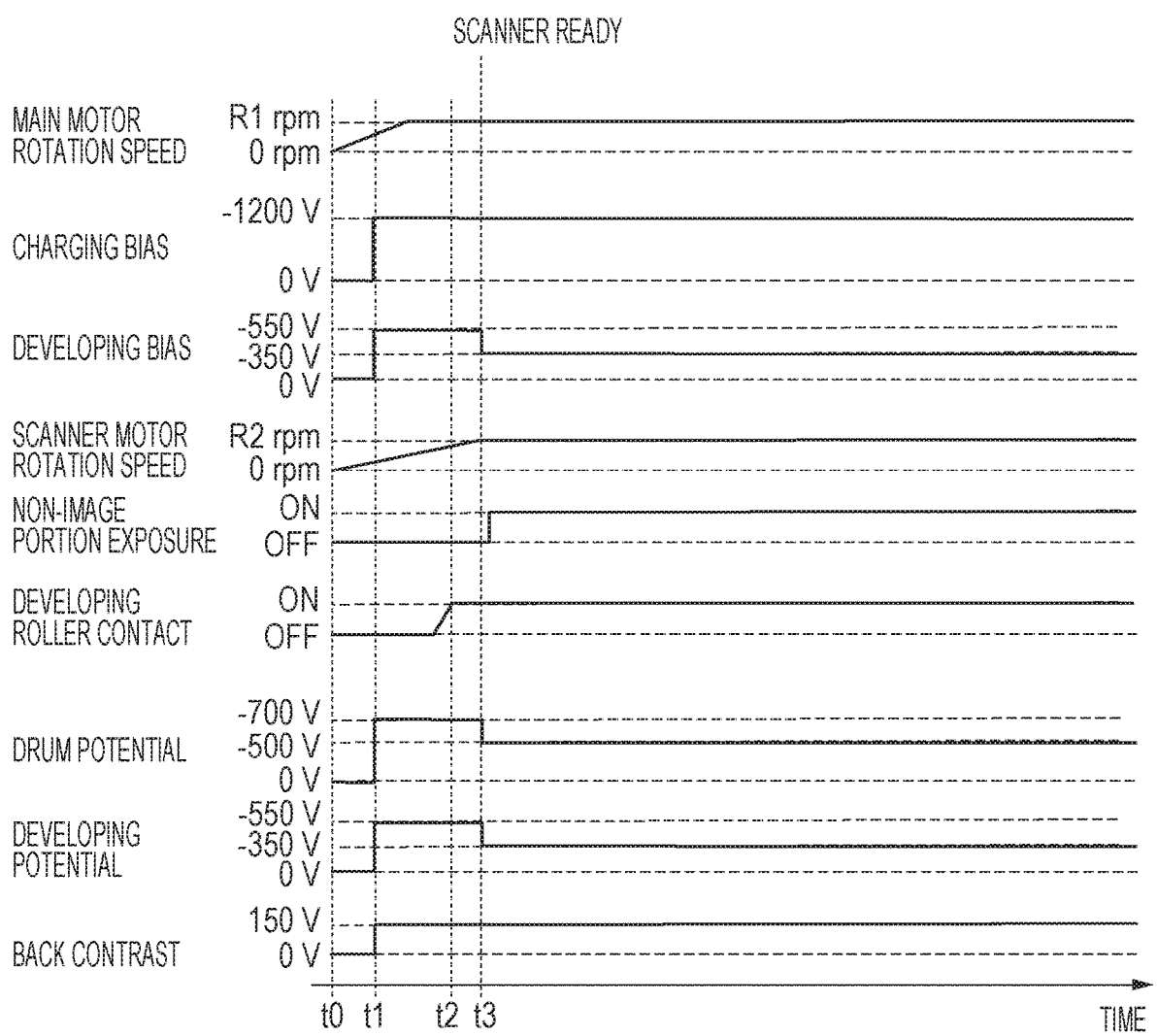
FIG. 8 is a timing chart of a preparation process.

The present embodiment will now be explained with reference to FIG. 8. FIG. 8 is a timing chart of image forming operation according to the present embodiment. First, at a point in time t0, an image signal is received from the image data receiving unit 81, and the preparation process starts. A non-illustrated main motor for driving the photosensitive drum 1a and the intermediate transfer belt 10 starts to rotate, and the scanner motor also starts to rotate.

After the start of rotation of the main motor, at a point in time t1, a voltage of −1,200V, which is the same value as that of a charging bias for forming an image, is applied as a charging bias so as to charge the photosensitive drum 1a into −700 V. Regarding a developing bias, at the same point in time t1, a developing bias during startup (an example of a second developing voltage) of −550 V is applied. The second developing voltage is set to have the same polarity as normal charge polarity of a toner (i.e., negative polarity) and to have an absolute value that is greater than the absolute value of a developing bias for forming an image (an example of a first developing voltage).

Next, at a point in time t2 after the completion of forcible ON duration in scanner control described earlier, the developing roller 5a arrives at the developing position to be brought into contact with the surface of the photosensitive drum 1a. After that, the scanner becomes ready at a point in time t3, and the preparation process ends.

After scanner ready, it is possible to perform non-image portion exposure for forming the surface potential of the photosensitive drum 1a. Therefore, the dark potential Vd of the photosensitive drum 1a is set into −500 V from −700 V by performing non-image portion exposure. Next, in synchronization with the timing of the arrival of the non-image-portion-exposed portion on the surface of the photosensitive drum 1a at the developing position, the developing bias is changed from the developing bias during startup of −550 V, which is an example of the second developing voltage, into the developing bias for forming an image of −350 V, which is an example of the first developing voltage. This makes it possible to perform image forming preparation while keeping the back contrast Vback, that is, the difference in surface potential between the developing roller 5a and the photosensitive drum 1a, at 150 V.

As explained above, in the present embodiment, the preparation process is controlled by the control unit 70 as follows. The developing roller 5a to which the developing bias during startup is applied arrives at the contact position when, on the surface of the photosensitive drum 1a, the portion charged by the charging roller 2a to which the charging bias for forming an image is applied is located at the developing position. That is, as illustrated in FIG. 8, the back contrast Vback is 150 V even before scanner ready, during which it is impossible to perform non-image portion exposure. This suppresses the occurrence of fogging.

The second developing voltage described herein as the developing bias during startup in the preparation process does not necessarily have to be set such that the back contrast Vback is 150 V. Let V4 be back contrast that is the difference between the surface potential of the photosensitive drum 1a that has not been exposed by the exposure unit 3a after having been charged using the charging bias for forming an image and the potential of the developing roller 5a to which the second developing voltage is applied. Let V5 be back contrast that is the difference between the surface potential of the photosensitive drum 1a that has not been exposed by the exposure unit 3a after having been charged using the charging bias for forming an image and the potential of the developing roller 5a to which the first developing voltage is applied. Given this definition, it is sufficient if the second developing voltage is set such that a relation of $|V4|<|V5|$ is satisfied between the absolute value of the back contrast V4 and the absolute value of the back contrast V5.

According to the study conducted by the inventors, if the amount of fog is approximately 3% or less, practically, it has almost no effect on image quality. As can be seen from FIG. 7, the amount of fog is approximately 3% or less within a range of ±60 V of "back contrast when an image is formed" (in FIG. 7, 150 V). Within this range, there is no decrease in image quality substantially. Let V6 be back contrast that is the difference between the surface potential of the photosensitive drum 1a for which non-image portion exposure has been performed by the exposure unit 3a after having been charged using the charging bias for forming an image and the potential of the developing roller 5a to which the first developing voltage is applied. The back contrast V6 is the back contrast when an image is formed. Therefore, it is advantageous if the back contrast V4 satisfies an equation of V4=V6±60 V.

The preparation process according to the present embodiment described above is a process before color image forming operation, and the first image forming station Sta is taken as an example in the above description. However, the preparation process may be a process before monochrome image forming operation. Specifically, in the monochrome case, the preparation process described above is executed similarly, with the replacement of the first image forming station Sta by the fourth image forming station Std.

As described above, the present embodiment makes it possible to avoid a toner from being transferred onto the surface of the photosensitive drum 1 even though the developing roller 5 is brought to the position for putting a toner onto the photosensitive drum 1 during the adjustment of the rotation speed of the polygon mirror 32. This prevents wasteful toner consumption from occurring due to aggravated fogging while reducing the FPOT by allowing the developing roller 5 to arrive at the position for putting a toner onto the photosensitive drum 1 during the adjustment of the rotation speed of the photosensitive drum 1.

Third Embodiment

In the structure of the image forming apparatus 100 according to the present embodiment, the same reference numerals are assigned to the same members as those of the first embodiment, and an explanation of them is omitted. The first image forming station Sta is taken as an example for explaining the image forming station St.

In the control described in the first and second embodiments, the charging bias or the developing bias is switched as a method for keeping the back contrast Vback constant before and after scanner ready. In the present embodiment, under an assumption that it takes longer for the starting up of the main motor than for the starting up of the scanner motor, the back contrast Vback is kept constant before and after the completion of the starting up of the main motor.

Figure 9:
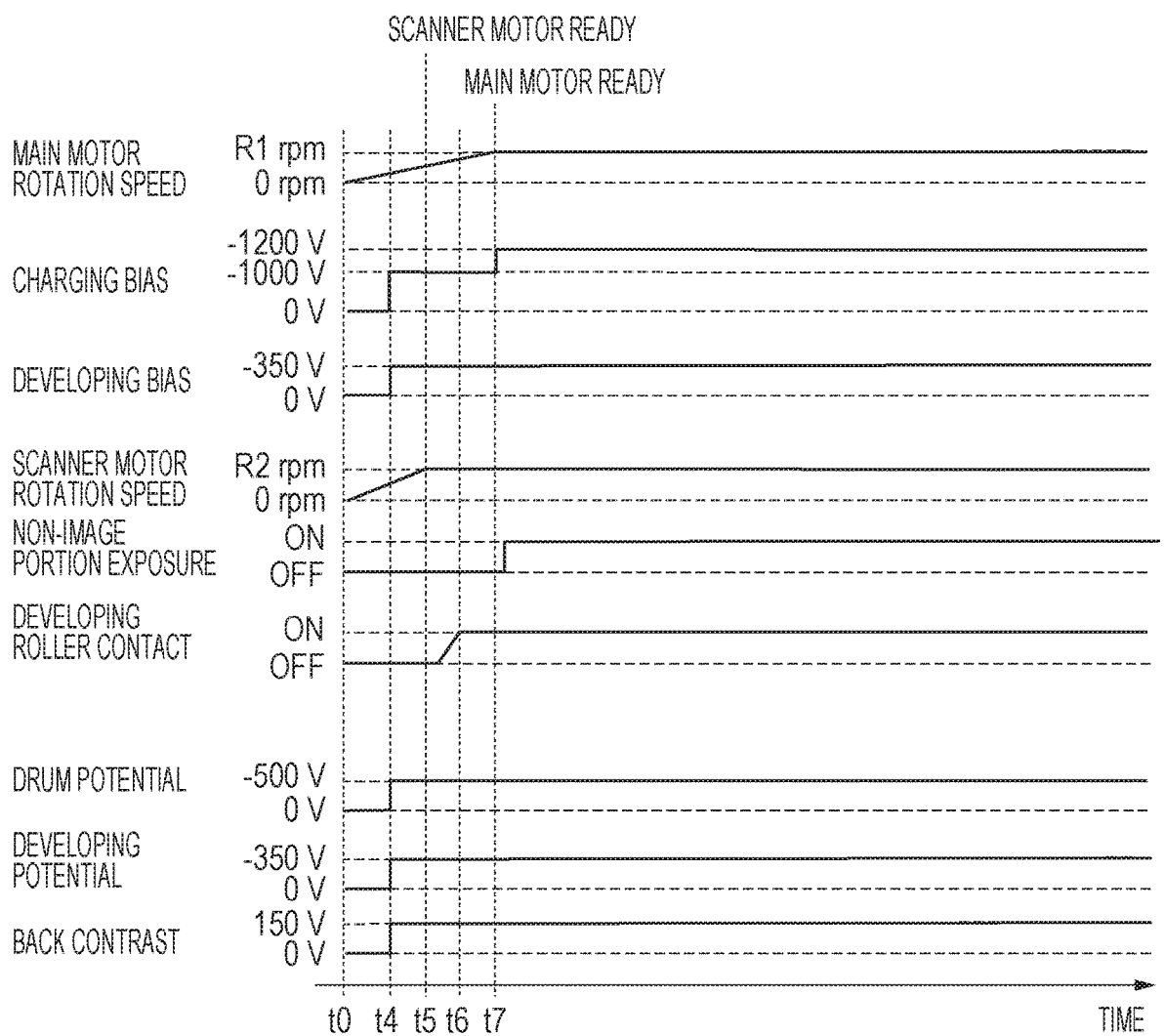
FIG. 9 is a timing chart of a preparation process.

The present embodiment will now be explained with reference to FIG. 9. FIG. 9 is a timing chart of image forming operation according to the present embodiment. First, at a point in time t0, an image signal is received from the image data receiving unit 81, and the preparation process starts. A non-illustrated main motor for driving the photosensitive drum 1a and the intermediate transfer belt 10 starts to rotate, and the scanner motor also starts to rotate.

After the start of rotation of the main motor, at a point in time t4, a voltage of −1,000V is applied as a charging bias during startup so as to charge the photosensitive drum 1a into −500 V. Drum surface potential generated by a charging bias depends solely on the potential difference between the photosensitive drum 1a and the charging roller 2a, not on the rotation speed of the photosensitive drum 1a. Therefore, it is all right to apply a charging bias during the process of accelerating the main motor. A developing bias of −350 V, which is the same value as that of a developing bias for forming an image, is also applied at the point in time t4. After that, the rotation speed of the scanner motor converges into a steady speed at a point in time t5, at which the scanner becomes ready. Next, at a point in time t6, the developing roller 5a arrives at the developing position to be brought into contact with the surface of the photosensitive drum 1a.

The main motor according to the present embodiment is used for rotating the photosensitive drums 1a, 1b, 1c, and 1d, the developing rollers 5a, 5b, 5c, and 5d, and the intermediate transfer belt 10. The time taken for starting up a motor into a steady speed differs depending on its load. In particular, the load by the photosensitive drums 1a, 1b, 1c, and 1d, the developing rollers 5a, 5b, 5c, and 5d, and the intermediate transfer belt 10 could vary significantly depending on ambient conditions and a sheet-passing state. Therefore, depending on the drive capability of the main motor used, long startup time is required for convergence, by acceleration or deceleration, of the speed of rotation into a speed within a predetermined speed range.

That is, in the structure of the present embodiment, it takes longer for the starting up of the main motor than for the starting up of the scanner motor. A state in which the starting up of the main motor has not completed yet means a state in which the speed of the photosensitive drum 1a has not reached or become steady at a speed for forming an image yet. Therefore, even if non-image portion exposure is performed in this state, desired surface potential of the photosensitive drum 1a cannot be obtained. Therefore, it is only after going into a main-motor-ready state that non-image portion exposure for forming the surface potential of the photosensitive drum 1a can be performed, wherein the main-motor-ready state is attained by the completion of starting up of the main motor with convergence of the speed of the photosensitive drum 1a into a speed for forming an image. The photosensitive drum 1a is driven by the main motor. The rotation speed of the photosensitive drum 1a is directly proportional to the rotation speed of the main motor. Therefore, the above-described process of starting up the main motor is defined as an example of a second speed adjustment process for adjusting the rotation speed of the photosensitive drum 1a into a rotation speed within a desired speed range.

At a point in time t7, at which the starting up of the main motor completes, preparation operation ends, and the charging bias is switched from −1,000 V, which is the level during startup, to −1,200 V, which is the level for forming an image. By switching the charging bias, the absolute value of the surface potential of the photosensitive drum 1a is increased. Then, non-image portion exposure is performed at the timing of arrival, at the exposure position, of the portion with increased surface potential on the surface of the photosensitive drum 1a, thereby keeping the dark potential Vd of the photosensitive drum 1a at −500 V. This makes it possible to perform image forming preparation while keeping the back contrast Vback, that is, the difference in surface potential between the developing roller 5a and the photosensitive drum 1a, at 150 V.

The second charging voltage described herein as the charging bias during startup in the preparation process does not necessarily have to be set such that the back contrast Vback is 150 V. That is, it is sufficient if the second charging voltage (the charging bias during startup) is set such that a relation of |V1|<|V2| is satisfied between the absolute value of the back contrast V1 and the absolute value of the back contrast V2.

According to the study conducted by the inventors, if the amount of fog is approximately 3% or less, practically, it has almost no effect on image quality. As can be seen from FIG. 7, the amount of fog is approximately 3% or less within a range of ±60 V of "back contrast when an image is formed" (in FIG. 7, 150 V). Within this range, there is no decrease in image quality substantially. The back contrast V3 is the back contrast when an image is formed. In the present embodiment, advantageously, the back contrast V1 satisfies an equation of V1=V3±60 V.

As explained above, in the present embodiment, the preparation process is controlled by the control unit 70 as follows. The developing roller 5a to which the developing bias for forming an image is applied arrives at the contact position when, on the surface of the photosensitive drum 1a, the portion charged by the charging roller 2a to which the charging bias during startup is applied is located at the developing position. That is, as illustrated in FIG. 9, the back contrast Vback is 150 V even before "main motor ready", during which it is impossible to perform non-image portion exposure. This suppresses the occurrence of fogging.

That is, the present embodiment makes it possible to avoid a toner from being transferred onto the surface of the photosensitive drum 1a even though the developing roller 5a is brought to the position for putting a toner onto the photosensitive drum 1a during the adjustment of the rotation speed of the photosensitive drum 1a. This prevents wasteful toner consumption from occurring due to aggravated fogging while reducing the FPOT by allowing the developing roller 5a to arrive at the position for putting a toner onto the photosensitive drum 1a during the adjustment of the rotation speed of the photosensitive drum 1a.

In the present embodiment, control of switching the charging bias as a method for keeping the back contrast Vback constant before and after "main motor ready" is explained. However, the method is not limited to this example. That is, the same effect can be obtained by keeping the back contrast Vback constant by switching the developing bias as explained in Second Embodiment. Specifically, the development bias is set to be the developing bias during startup of −550 V, which is an example of the second developing voltage, during the period from t4 to t7 before the timing of the arrival of the non-image-portion-exposed portion on the surface of the photosensitive drum 1a at the developing position. Then, in synchronization with the timing of the arrival of the non-image-portion-exposed portion on the surface of the photosensitive drum 1a at the developing position, the developing bias is changed from the second developing voltage of −550 V into the first developing voltage of −350 V (the developing bias for forming an image).

Figure 10:
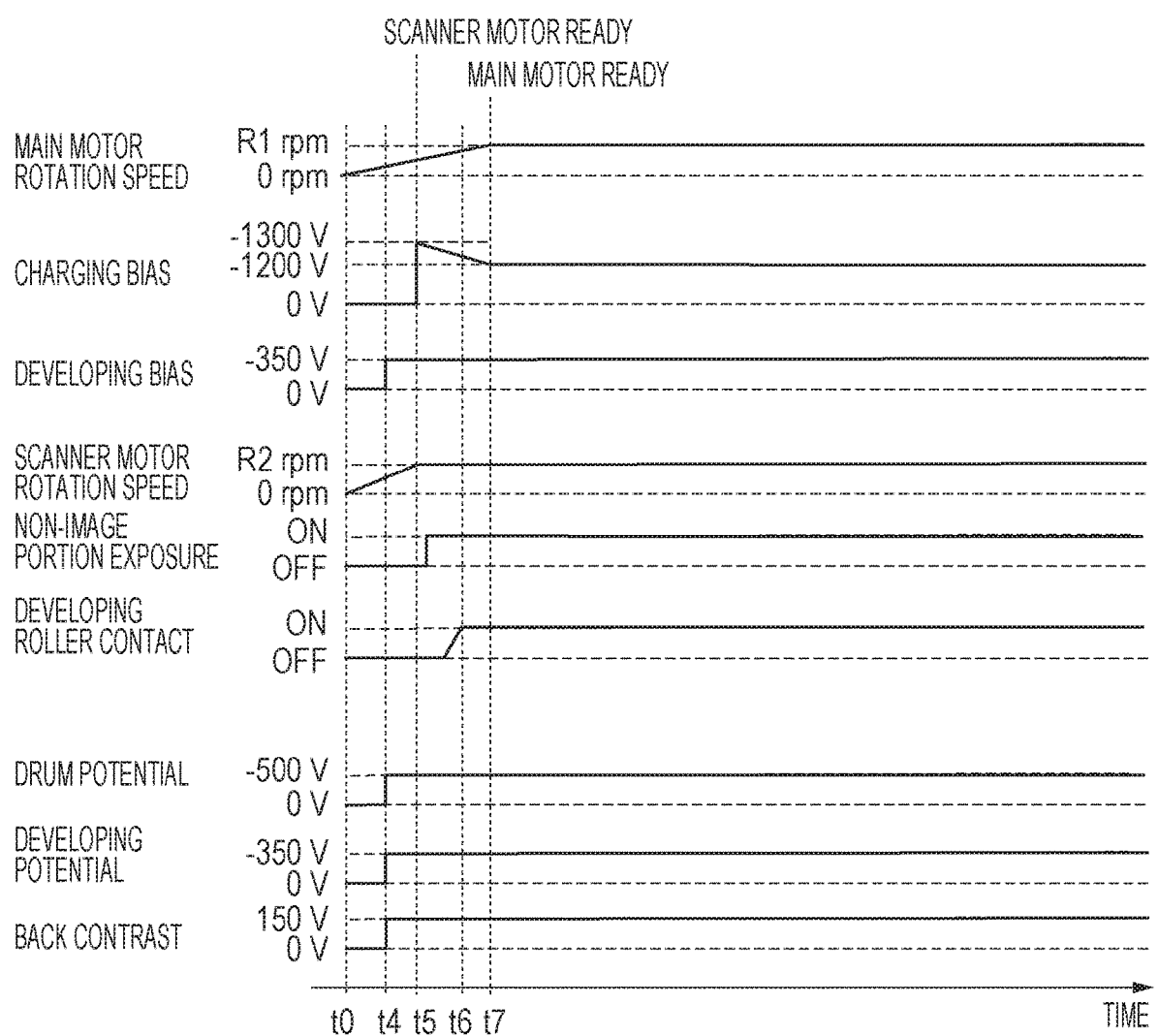
FIG. 10 is a timing chart of a preparation process.

In the present embodiment, non-image portion exposure starts after the completion of the starting up of the main motor. However, it is not limited to such an example. For example, as illustrated in FIG. 10, non-image portion exposure may start after scanner ready before main motor ready. In such a case, since the main motor is in the process of starting up, it follows that non-image portion exposure is performed when the speed of the photosensitive drum 1a has not become steady yet. For this reason, the amount of exposure per area on the surface of the photosensitive drum 1a by non-image portion exposure is not constant. That is, even if non-image portion exposure is performed with a constant amount of emission, the surface potential of the photosensitive drum 1a after the non-image portion exposure varies depending on the speed of the photosensitive drum 1a during the non-image portion exposure.

In view of the above, charging is performed while changing the value of the charging bias in accordance with a change in the rotation speed of the photosensitive drum 1a. Then, the exposure unit 3a starts non-image portion exposure at the timing of the arrival, at the exposure position EP, of the portion charged by the charging roller 2a to which the above charging bias is applied on the surface of the photosensitive drum 1a. By performing the control of the charging bias and non-image portion exposure in this way, it is possible to keep the surface potential of the photosensitive drum 1a constant at −500 V. The surface potential of the photosensitive drum 1a of −500 V is a level at which no toner is put onto the photosensitive drum 1a when the developing roller 5a to which the developing voltage for forming an image, −350 V, is applied is located at the contact position.

The above charging bias, which varies in accordance with a change in the rotation speed of the photosensitive drum 1a during startup in the preparation process, does not necessarily have to be set such that the back contrast Vback is 150 V after non-image portion exposure. Let V7 be the difference between the surface potential of the photosensitive drum 1a for which non-image portion exposure has been performed by the exposure unit 3a after having been charged using the above charging bias, which varies in accordance with a change in the rotation speed of the photosensitive drum 1a, and the potential of the developing roller 5a to which the developing bias for forming an image is applied. V7 is back contrast at the time of developing roller contact in the preparation process. Let V8 be the difference between the surface potential of the photosensitive drum 1a that has not been exposed by the exposure unit 3a after having been charged using the first charging voltage, which is an example of the charging bias for forming an image, and the potential of the developing roller 5a to which the developing bias for forming an image is applied. V8 is the back contrast of the comparative example=350 V. It is sufficient if the charging bias varies in accordance with a change in the rotation speed of the photosensitive drum 1a such that a relation of |V7|<|V8| is satisfied between the absolute value of the back contrast V7 and the absolute value of the back contrast V8.

The preparation process according to the present embodiment described above is a process before color image forming operation, and the first image forming station Sta is taken as an example in the above description. However, the preparation process may be a process before monochrome image forming operation. Specifically, in the monochrome case, the preparation process described above is executed similarly, with the replacement of the first image forming station Sta by the fourth image forming station Std.

As explained above, in the present embodiment, the preparation process is controlled by the control unit 70 as follows. Specifically, the surface of the photosensitive drum 1a is charged by the charging roller 2a to which the charging bias is applied while changing the value of the charging bias in accordance with a change in the rotation speed of the photosensitive drum 1a, and non-image portion exposure is performed by the exposure unit 3a to generate a portion having −500 V on the surface of the photosensitive drum 1a. Then, when the surface portion of the photosensitive drum 1a set into −500 V is located at the developing position, the developing roller 5a to which the developing bias for forming an image (−350 V) is applied arrives at the contact position. That is, as illustrated in FIG. 10, since the back contrast Vback is 150 V even though non-image portion exposure is performed before main motor ready, the occurrence of fogging is suppressed. Therefore, it is possible to keep the back contrast Vback constant in a state of after scanner ready and before main motor ready.

Therefore, it is possible to avoid a toner from being transferred onto the surface of the photosensitive drum 1 even though the developing roller 5 is brought to the contact position, which is the position for putting a toner onto the photosensitive drum 1, during the adjustment of the rotation speed of the photosensitive drum 1. This prevents wasteful toner consumption from occurring due to aggravated fogging while reducing the FPOT by allowing the developing roller 5 to arrive at the position for putting a toner onto the photosensitive drum 1 during the adjustment of the rotation speed of the photosensitive drum 1.

In the present embodiment, a laser scanner unit using the polygon mirror 32a, which is rotatable, is described as the exposure unit 3a. However, the structure of the exposure unit 3a is not limited to this example. For example, a unit that includes a plurality of light emitting elements 301 such as LEDs arranged in a direction parallel to the rotating axial direction of the photosensitive drum 1a may be used as the exposure unit 3a, 3b, 3c, 3d. The exposure unit 3 includes a lens 302 for condensing light emitted from the plurality of light emitting elements 301 onto the surface of the photosensitive drum 1a. The emission of the plurality of light emitting elements 301 is controlled independently of one another by an emission signal generated on the basis of image data for image portion exposure and non-image portion exposure on the surface of the photosensitive drum 1a.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-202089, filed Oct. 18, 2017, which is hereby incorporated by reference herein in its entirety.

What is claimed is:

1. An image forming apparatus, comprising:
a photosensitive member;
a charging member configured to charge a surface of the photosensitive member;
an exposure unit configured to perform a non-image portion exposure and an image portion exposure on the photosensitive member after charged by the charging member, wherein the non-image portion exposure generates a surface potential which is not for forming a toner image, and the image portion exposure generates a surface potential for forming the toner image, and wherein the exposure amount of the image portion exposure is larger than the exposure amount of the non-image portion exposure;
a developing member configured to form the toner image by supplying a toner onto the surface of the photosensitive member;
a moving member configured to enable the developing member to move between a first position for putting the toner onto the photosensitive member and a second position for not putting the toner onto the photosensitive member;
a charging voltage applying unit configured to apply a charging voltage to the charging member;
a developing voltage applying unit configured to apply a developing voltage to the developing member; and
a control unit configured to control the charging voltage applying unit and the developing voltage applying unit;
wherein the control unit is configured to control the charging voltage applying unit and the developing voltage applying unit to apply (i) a first charging voltage and to perform the image portion exposure and the non-image portion exposure on the surface of the photosensitive member by the exposure unit in a first process and (ii) a second charging voltage in a second process in which the image portion exposure and the non-image portion exposure are not performed on the surface of the photosensitive member by the exposure unit, and cause the moving member to move the developing member from the second position to the first position in the second process,
wherein a potential difference between the photosensitive member charged by the charging member to which the second charging voltage is applied in the second process and the developing member is defined as V1,
wherein a potential difference between the photosensitive member charged by the charging member to which the first charging voltage is applied before the image portion exposure and the non-image portion exposure are performed in the first process and the developing member is defined as V2, and
wherein the control unit performs control such that a relation of $|v1|<|v2|$ is satisfied.

2. The image forming apparatus according to claim 1, wherein the second charging voltage is set to have the same polarity as a normal charge polarity of the toner formed on the photosensitive member exposed by the image portion exposure and to have an absolute value that is less than an absolute value of the first charging voltage.

3. The image forming apparatus according to claim 1, wherein a difference between the surface potential of the photosensitive member for which the non-image portion exposure has been performed in the first process and the potential of the developing member to which the developing voltage is applied is defined as V3, and
wherein the control unit performs control such that an equation of $V1=V3\pm 60$ V is satisfied.

4. The image forming apparatus according to claim 1, wherein a difference between the surface potential of the photosensitive member for which the non-image portion exposure has been performed in the first process and the potential of the developing member to which the developing voltage is applied is defined as V3, and
wherein the control unit performs control such that an equation of $V1=V3$ is satisfied.

5. The image forming apparatus according to claim 1, wherein the exposure unit includes a light source unit and a rotating polygon mirror configured to reflect light emitted from the light source unit while rotating;
wherein the control unit performs control in such a way as to, in the second process, execute a first speed adjustment process for adjusting a rotation speed of the rotating polygon mirror into a speed within a predetermined speed range and to cause the moving member to move the developing member from the second position to the first position during execution of the first speed adjustment process.

6. The image forming apparatus according to claim 5, wherein the exposure unit includes a light receiving unit configured to receive the light reflected by the rotating polygon mirror, and
wherein the control unit performs control in such a way as to, in the second process, cause the light source unit not to perform emission during a period in which the light reflected by the rotating polygon mirror reaches the surface of the photosensitive member and cause the light source unit to perform emission during a period in which the light reflected by the rotating polygon mirror reaches the light receiving unit.

7. The image forming apparatus according to claim 1, wherein the control unit performs control in such a way as to, in the second process, execute a second speed adjustment process for adjusting a rotation speed of the photosensitive member into a speed within a predetermined speed range and to cause the moving member to move the developing member from the second position to the first position during execution of the second speed adjustment process.

8. The image forming apparatus according to claim 1, wherein the exposure unit includes a light source unit, a rotating polygon mirror configured to reflect light emitted from the light source unit while rotating, and a light receiving unit configured to receive the light reflected by the rotating polygon mirror;

wherein the control unit performs control in such a way as to, in the second process, cause the light source unit not to perform emission during a period in which the light reflected by the rotating polygon mirror reaches the surface of the photosensitive member and cause the light source unit to perform emission during a period in which the light reflected by the rotating polygon mirror reaches the light receiving unit.

9. The image forming apparatus according to claim 1, wherein the exposure unit includes a plurality of light sources arranged in a rotating axial direction of the photosensitive member in such a way as to face the surface of the photosensitive member.

10. The image forming apparatus according to claim 1, further comprising:
an acquisition unit configured to acquire image data;
wherein the control unit performs control in such a way as to execute the second process after acquisition of the image data by the acquisition unit and to execute the first process on a basis of the image data after the second process.

* * * * *